US012074465B2

(12) United States Patent
Nakao

(10) Patent No.: US 12,074,465 B2
(45) Date of Patent: Aug. 27, 2024

(54) CONTROL DEVICE, ELECTRIC STORAGE DEVICE, ELECTRIC STORAGE SYSTEM, AND COMPUTER-READABLE MEDIUM

(71) Applicant: NExT-e Solutions Inc., Tokyo (JP)

(72) Inventor: Fumiaki Nakao, Shizuoka (JP)

(73) Assignee: NExT-e Solutions Inc., Tokyo (JP)

( * ) Notice: Subject to any disclaimer, the term of this patent is extended or adjusted under 35 U.S.C. 154(b) by 0 days.

(21) Appl. No.: 15/841,254

(22) Filed: Dec. 13, 2017

(65) Prior Publication Data

US 2018/0109120 A1 Apr. 19, 2018

Related U.S. Application Data

(63) Continuation of application No. PCT/JP2016/083976, filed on Nov. 16, 2016.

(30) Foreign Application Priority Data

Nov. 18, 2015 (JP) .................................. 2015-226100

(51) Int. Cl.
*H02J 7/00* (2006.01)
*H01M 10/42* (2006.01)
(Continued)

(52) U.S. Cl.
CPC ........... *H02J 7/0016* (2013.01); *H01M 10/44* (2013.01); *H02J 7/0019* (2013.01);
(Continued)

(58) Field of Classification Search
CPC ..................................................... H02J 7/0013
See application file for complete search history.

(56) References Cited

U.S. PATENT DOCUMENTS 5,115,193 A 5/1992 Bean
5,576,608 A 11/1996 Nagai
(Continued)

FOREIGN PATENT DOCUMENTS

CN 1783639 A 6/2006
CN 102576630 A 7/2012
(Continued)

OTHER PUBLICATIONS

WO-2012043723 translation, Yamaguchi Masao (Year: 2012).*
(Continued)

*Primary Examiner* — Drew A Dunn
*Assistant Examiner* — Tynese V McDaniel

(57) ABSTRACT

When one of the electric storage modules connected in parallel is individually replaced, the voltage of an electric storage module to be newly added and the voltage of the remaining electric storage module(s) need to match each other with high precision before the electric storage module to be newly added is attached to an electric storage system. A control device includes a control unit for controlling a switching element arranged between a wire and an electric storage unit such that: (i) the switching element electrically connects the wire and the electric storage unit if terminal voltage of the switching element satisfies a predetermined condition; and (ii) the switching element electrically disconnects the wire and the electric storage unit if the terminal voltage of the switching element does not satisfy the predetermined condition.

17 Claims, 9 Drawing Sheets

(51) Int. Cl.
   *H01M 10/44* (2006.01)
   *H01M 10/48* (2006.01)
(52) U.S. Cl.
   CPC .. *H01M 10/425* (2013.01); *H01M 2010/4271* (2013.01); *H01M 10/48* (2013.01); *Y02T 10/70* (2013.01)

(56) References Cited

U.S. PATENT DOCUMENTS

| | | | |
|---|---|---|---|
| 6,118,250 | A | 9/2000 | Hutchison, IV |
| 2004/0062059 | A1 | 4/2004 | Cheng |
| 2006/0091860 | A1 | 5/2006 | Nakamiya |
| 2006/0214639 | A1 | 9/2006 | Miwa |
| 2010/0231178 | A1 | 9/2010 | Handa |
| 2011/0089898 | A1 | 4/2011 | Lee |
| 2011/0198921 | A1 | 8/2011 | Sone |
| 2012/0175966 | A1 | 7/2012 | Nakashima et al. |
| 2012/0236451 | A1 | 9/2012 | Nakashima |
| 2012/0249074 | A1 | 10/2012 | Tsuchiya |
| 2012/0268070 | A1* | 10/2012 | Park ................... H01M 10/441 320/126 |
| 2013/0063091 | A1 | 3/2013 | Nishi |
| 2013/0181655 | A1 | 7/2013 | Yokoyama |
| 2013/0200848 | A1* | 8/2013 | Ozawa ................. H02J 7/0019 320/112 |
| 2013/0320927 | A1 | 12/2013 | Kumagai |
| 2014/0009092 | A1 | 1/2014 | Ma |
| 2014/0184159 | A1 | 7/2014 | Kachi |
| 2015/0002083 | A1* | 1/2015 | Nakao .................. H02J 7/0016 320/107 |
| 2015/0002084 | A1* | 1/2015 | Nakao ................. H02J 7/00308 320/107 |
| 2015/0244191 | A1* | 8/2015 | Matsumura .......... H02J 7/0021 320/116 |
| 2015/0283964 | A1 | 10/2015 | Janarthanam |
| 2015/0336469 | A1 | 11/2015 | Ladhari |
| 2016/0028256 | A1* | 1/2016 | Kubota ................ H02J 7/0014 320/118 |
| 2016/0049813 | A1* | 2/2016 | Takizawa ............ H01M 10/441 320/112 |
| 2016/0049814 | A1* | 2/2016 | Sugiyama ............ H02J 7/0021 320/128 |
| 2016/0181836 | A1 | 6/2016 | Kanabe |
| 2017/0084959 | A1* | 3/2017 | Nakao .................. H02J 7/0048 |
| 2017/0158082 | A1* | 6/2017 | Tahara ................... F02D 17/00 |
| 2018/0048165 | A1 | 2/2018 | Shiraishi |
| 2018/0109120 | A1 | 4/2018 | Nakao |
| 2018/0233787 | A1* | 8/2018 | Kubota ................. H01M 10/44 |
| 2018/0309172 | A1 | 10/2018 | Ito |
| 2019/0039476 | A1* | 2/2019 | Nakao ................... G01R 31/396 |
| 2019/0148963 | A1* | 5/2019 | Nakao .................... B60L 50/66 320/134 |
| 2019/0210481 | A1 | 7/2019 | Ishida |
| 2021/0091577 | A1* | 3/2021 | Nakao ................... H02J 7/0029 |
| 2021/0091587 | A1* | 3/2021 | Nakao ................... H02J 7/0031 |
| 2022/0037910 | A1 | 2/2022 | Tikhonski |
| 2022/0077703 | A1* | 3/2022 | Nakao ............... H01M 10/0525 |
| 2022/0399734 | A1* | 12/2022 | Nakao ................. H01M 10/441 |

FOREIGN PATENT DOCUMENTS

| | | |
|---|---|---|
| CN | 103457342 A | 12/2013 |
| CN | 105009405 A | 10/2015 |
| CN | 204895155 U | 12/2015 |
| CN | 105453375 A | 3/2016 |
| CN | 107706958 A | 2/2018 |
| CN | 108428951 A | 8/2018 |
| JP | 106325794 A | 11/1994 |
| JP | H1198708 A | 4/1999 |
| JP | 2001312931 A | 11/2001 |
| JP | 2006156003 A | 6/2006 |
| JP | 2006280060 A | 10/2006 |
| JP | 2007110887 A | 4/2007 |
| JP | 2007259612 A | 10/2007 |
| JP | 2007336782 A | 12/2007 |
| JP | 2008206357 A | 9/2008 |
| JP | 2010200581 A | 9/2010 |
| JP | 2012085461 A | 4/2012 |
| JP | 2012090436 A * | 5/2012 ............ H02J 7/0019 |
| JP | 2013179739 A | 9/2013 |
| JP | 2015065765 A | 4/2015 |
| JP | 2015198560 A | 11/2015 |
| JP | 2016048994 A | 4/2016 |
| JP | 2017112802 A | 6/2017 |
| JP | 2017168244 A | 9/2017 |
| JP | 2019036507 A | 3/2019 |
| JP | 2019092257 A | 6/2019 |
| TW | 201230611 A1 | 7/2012 |
| TW | 201707334 A | 2/2017 |
| WO | WO-2012043723 A1 * | 4/2012 ............ H02J 7/0019 |
| WO | 2012168963 A1 | 12/2012 |
| WO | 2013046659 A1 | 4/2013 |
| WO | 2013054795 A1 | 4/2013 |
| WO | 2014033880 A1 | 3/2014 |
| WO | 2017086349 A1 | 5/2017 |

OTHER PUBLICATIONS

International Search Report for International Patent Application No. PCT/JP2016/083976, issued by the Japan Patent Office on Dec. 27, 2016.
International Preliminary Report on Patentability for International Application No. PCT/JP2016/083976, issued by the International Bureau of WIPO on May 22, 2018.
Office Action issued for counterpart Japanese Application 2017-551903, issued by the Japan Patent Office on May 22, 2018.
Office Action issued for counterpart Chinese Application 201680027496.9, issued by the China National Intellectual Property Administration on Sep. 29, 2020.
Office Action issued for counterpart Japanese Application No. 2018-161768, issued by the Japanese Patent Office on Oct. 6, 2020 (drafted on Oct. 2, 2020).
"Cambridge English Dictionary", definition of 'Module', https://dictionary.cambridge.org/dictionary/english/module, Retrieved from Internet on Jan. 13, 2022.
(ISA/237) Written Opinion of the International Search Authority for International Patent Application No. PCT/JP2019/038328, mailed by the Japan Patent Office on Nov. 26, 2019.
(ISA/237) Written Opinion of the International Search Authority for International Patent Application No. PCT/JP2019/041212, mailed by the Japan Patent Office on Nov. 12, 2019.
(ISA/237) Written Opinion of the International Search Authority for International Patent Application No. PCT/JP2020/040990, issued/mailed by the Japan Patent Office on Jan. 12, 2021.
Office Action issued for related Chinese Application 201711286920.4, issued by The State Intellectual Property Office of People's Republic of China on May 19, 2023.
Office Action issued for related Chinese Application 201980031958.8, issued by The State Intellectual Property Office of People's Republic of China on May 20, 2023.
Office Action issued for related Taiwanese Application 108135983, transmitted from the Taiwan Intellectual Property Office on Nov. 14, 2023 (issued on Nov. 13, 2023).
Office Action issued for related U.S. Appl. No. 17/110,296, issued by the US Patent and Trademark Office on Mar. 18, 2022.
Office Action issued for counterpart Taiwanese Application 106115979, issued by the Taiwan Intellectual Property Office on Aug. 7, 2018.
Office Action issued for related Japanese Application No. 2020-151672, transmitted from the Japanese Patent Office on May 21, 2024 (drafted on May 10, 2024).

* cited by examiner

CONTROL DEVICE, ELECTRIC STORAGE DEVICE, ELECTRIC STORAGE SYSTEM, AND COMPUTER-READABLE MEDIUM

The contents of the following Japanese patent applications are incorporated herein by reference:
NO. 2015-226100 filed on Nov. 18, 2015.
NO. PCT/JP2016/083976 filed on Nov. 16, 2016.

BACKGROUND

1. Technical Field

The present invention relates to a control device, an electric storage device, an electric storage system, and a computer-readable medium.

2. Related Art

In an electric storage system including a plurality of electric storage modules, the electric storage modules are connected in parallel in some cases (for example, see Patent Document 1).

Patent Document

Patent Document 1: Japanese Patent Application Publication No. H11-98708

However, when one of the electric storage modules connected in parallel is individually replaced, the voltage of an electric storage module to be newly added and the voltage of the remaining electric storage module (s) need to match each other with high precision before the electric storage module to be newly added is attached to the electric storage system.

SUMMARY

A first aspect of the present invention provides a control device. The above described control device may be a control device for controlling current flowing between an electric storage unit of an electric storage device configured such that the electric storage device can be connected in parallel with a distinct power supply device, and a wire that electrically connects the electric storage device and the distinct power supply device. The above described control device includes, for example, a control unit for controlling a switching element arranged between the wire and the electric storage unit such that: (i) the switching element electrically connects the wire and the electric storage unit if terminal voltage of the switching element satisfies a predetermined condition; and (ii) the switching element electrically disconnects the wire and the electric storage unit if the terminal voltage of the switching element does not satisfy the predetermined condition.

In the above described control device, the control unit may have a determining unit that determines whether the terminal voltage of the switching element is within a predetermined range. In the above described control device, the control unit may have a signal generating unit that: (i) generates a signal for turning on the switching element if the determining unit has determined that the terminal voltage of the switching element is within the predetermined range; or (ii) generates a signal for turning off the switching element if the determining unit has determined that the terminal voltage of the switching element is not in the predetermined range.

In the above described control device, the signal generating unit may generate the signal subsequent to passage of a predetermined amount of time after the determining unit determines whether the terminal voltage of the switching element is within the predetermined range. The above described control device may further include the switching element. In the above described control device, the switching element may have a field effect transistor and a relay circuit that are connected in parallel.

In the above described control device, the control unit may have a first signal receiving unit that receives a first signal indicating that terminal voltage of the electric storage device is lower than terminal voltage of the distinct power supply device. In the above described control device, the signal generating unit may generate a signal for turning on the switching element if the first signal receiving unit has received the first signal. In the above described control device, the control unit may have a second signal receiving unit that receives a second signal indicating that terminal voltage of the electric storage device is higher than terminal voltage of the distinct power supply device. In the above described control device, the signal generating unit may generate a signal for turning on the switching element if the second signal receiving unit has received the second signal.

In the above described control device, the control unit may have a third signal receiving unit that receives a third signal indicating that terminal voltage of the electric storage device is outside the predetermined range. In the above described control device, the signal generating unit may generate a signal for turning off the switching element if the third signal receiving unit has received the third signal. In the above described control device, the electric storage unit may have a plurality of electric storage cells connected in series. The above described control device may further include a balance correcting unit that equalizes voltage of the plurality of electric storage cells.

In the above described control device, the distinct power supply device may also include a distinct electric storage device different from the electric storage device. In the above described control device, a deterioration state of the electric storage unit and a deterioration state of an electric storage unit of the distinct electric storage device may be different. In the above described control device, a type of the electric storage unit and a type of an electric storage unit of the distinct electric storage device may be different.

The above described control device may also include a battery characteristic acquiring unit that acquires information related to battery characteristic of the electric storage unit. The above described control device may also include an output unit that outputs to an external apparatus of the control device information related to the battery characteristic of the electric storage unit and having been acquired by the battery characteristic acquiring unit.

A second aspect of the present invention provides an electric storage device. The above described electric storage device includes the above described control device and the electric storage unit.

A third aspect of the present invention provides an electric storage system. In the above described electric storage system, a plurality of the above described electric storage devices are connected in parallel.

A fourth aspect of the present invention provides an electric storage system. In the above described electric storage system, a plurality of the above described electric storage devices are connected in a matrix.

A fifth aspect of the present invention provides a program. The above described program may cause a computer to function as the above described control device. A non-transitory computer-readable medium for storing the above described program may also be provided.

The summary clause does not necessarily describe all necessary features of the embodiments of the present invention. The present invention may also be a sub-combination of the features described above.

DESCRIPTION OF EXEMPLARY EMBODIMENTS

Figure 1:
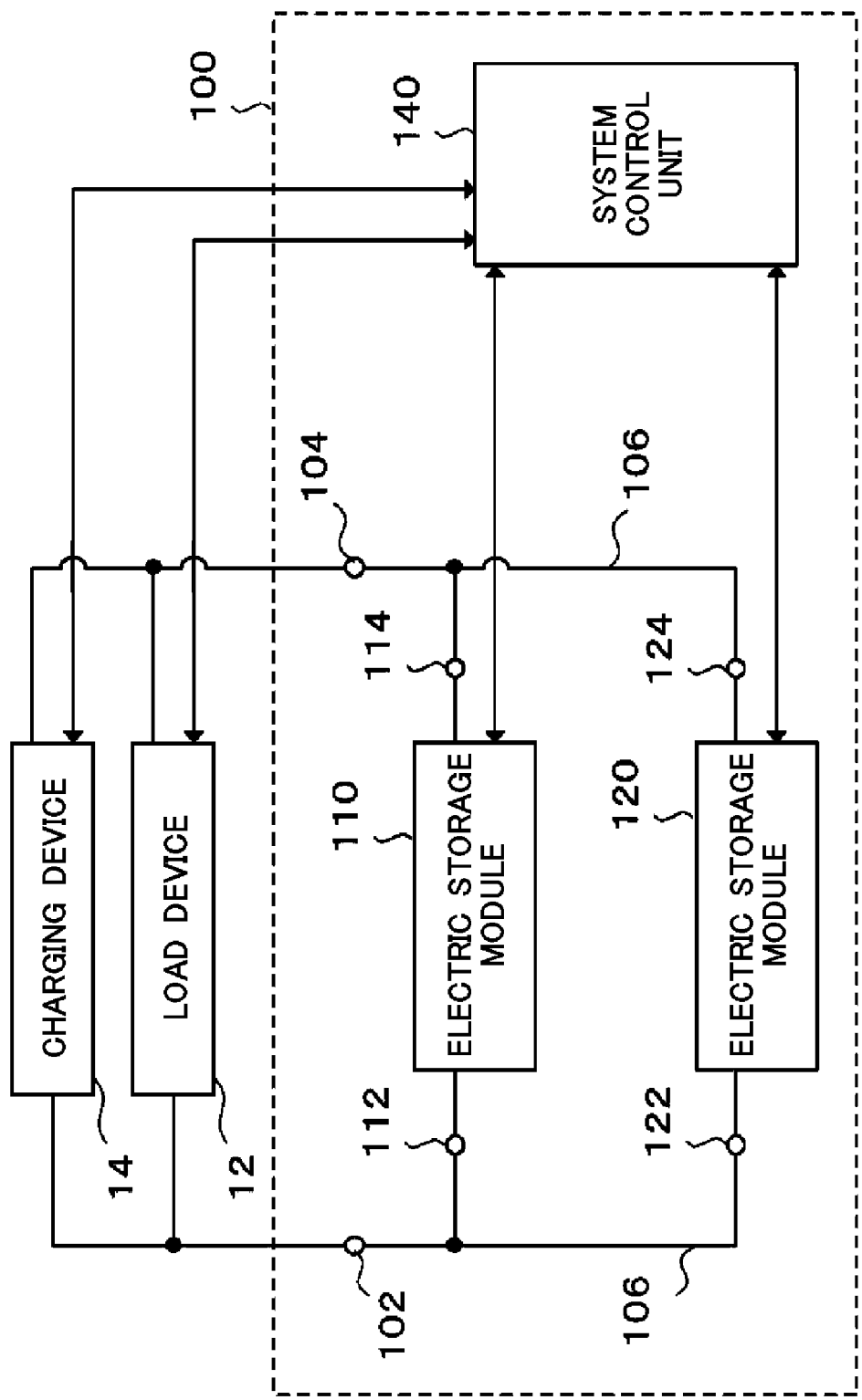
FIG. 1 schematically shows an example of a system configuration of an electric storage system 100.

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention. Also, the embodiment(s) will be described with reference to the drawings. The identical or similar parts in the drawings may be given the same reference numerals to omit the description that could otherwise overlap.

FIG. 1 schematically shows an example of a system configuration of an electric storage system 100. In an embodiment, the electric storage system 100 is electrically connected to a load device 12 and supplies power to the load device 12 (in some cases, this is referred to as discharge from the electric storage system 100). In another embodiment, the electric storage system 100 is electrically connected to a charging device 14 to accumulate electrical energy (in some cases, this is referred to as charge of the electric storage system). The electric storage system 100 may be used, for example, in electric storage devices, electrical appliances, and transport equipment. Examples of the transport equipment include electric vehicles, hybrid cars, electric two-wheeled vehicles, railway vehicles, airplanes, elevators, and cranes.

In the present embodiment, the electric storage system 100 includes a connection terminal 102, a connection terminal 104, a wire 106 electrically connecting the connection terminal 102 and the connection terminal 104, an electric storage module 110 having a positive terminal 112 and a negative terminal 114, an electric storage module 120 having a positive terminal 122 and a negative terminal 124, and a system control unit 140. The electric storage module 110 and the electric storage module 120 may be examples of the electric storage devices configured such that they can be connected in parallel. For example, the electric storage module 110 may be an example of an electric storage device, and the electric storage module 120 may be an example of a distinct electric storage device. The electric storage device may be an example of a power supply device. The system control unit 140 may be an example of a battery characteristic acquiring unit. The system control unit 140 may be an example of an output unit.

The electric storage system 100 is electrically connected to the load device 12 or the charging device 14 via the connection terminal 102 and the connection terminal 104. In the present embodiment, the electric storage module 110 and the electric storage module 120 are connected in parallel by a wire 106. Also, each of the electric storage module 110 and the electric storage module 120 is held in a housing of the electric storage system 100 in an attachable and detachable manner. Each of the electric storage module 110 and the electric storage module 120 can thereby be replaced individually.

In the present embodiment, each of the electric storage module 110 and the electric storage module 120 can switch the connection relationship of its electric storage unit and the wire 106, based on a control signal from the system control unit 140 or the user operation. For example, each of the electric storage module 110 and the electric storage module 120 can electrically connect its electric storage unit to the wire 106 and electrically disconnect its electric storage unit from the wire 106 based on a control signal from the system control unit 140 or the user operation.

Each of the plurality of electric storage modules included in the electric storage system 100 can thereby be individually replaced without concerns about the damage or deterioration of the electric storage module even if the voltage of an electric storage module to be newly implemented in the electric storage system 100 and the voltage of the electric storage module already implemented in electric storage system 100 are different. The reasons for this are, for example, as described below.

Owing to improvements in the performance of lithium-ion batteries in recent years, the impedance of the lithium-ion battery has dropped to approximately 10 mΩ. Because of this, for example, even if the voltage differential between two electric storage modules is only 0.4 V, a large current as much as 40 A flows from the electric storage module having a higher voltage toward an electric storage module having a lower voltage when the two electric storage modules are connected in parallel. As a result, the electric storage module(s) deteriorate or are damaged. Note that the voltage of the electric storage module may be the voltage between the positive terminal and the negative terminal of the electric storage module (in some cases, the voltage is referred to as the terminal voltage of the electric storage module).

If one of the plurality of electric storage modules connected in parallel is individually replaced, in order to prevent the deterioration or damage of the electric storage modules associated with replacing the electric storage module, the voltage of the electric storage module to be newly implemented and the voltage of the already implemented electric storage module may be adjusted, prior to replacing the electric storage module, over some time until the voltage differential between the electric storage modules becomes very small. By making the voltage differential between the electric storage module to be newly implemented and the already implemented electric storage module very small, a large current can be prevented from flowing into each electric storage module when the electric storage module is replaced. As a result, the deterioration or damage of the electric storage modules can be suppressed. However, as the impedance of the lithium-ion battery decreases, the tolerance of the voltage differential between the electric storage module to be newly implemented and the already implemented electric storage module also decreases, so that it may take a great amount of time to adjust the voltage differential.

In contrast, according to the electric storage system 100 of the present embodiment, each of the electric storage module 110 and the electric storage module 120 can switch the connection relationship between its electric storage unit and the wire 106, based on a control signal from the system control unit 140 or the user operation. Then, the electric storage module 110 can be replaced, for example, in accordance with the following procedure.

First, a user detaches an old electric storage module 110 from the electric storage system 100. Then, the user performs operation for electrically disconnecting the electric storage unit of a new electric storage module 110 and the wire 106 before implementing the new electric storage module 110 in the electric storage system 100. For example, the user electrically disconnects the positive terminal 112 and the electric storage unit by manually operating a switching element arranged between the positive terminal 112 and the electric storage unit of the electric storage module 110.

Subsequently, the user implements the electric storage module 110 in the electric storage system 100, with the positive terminal 112 and the electric storage unit electrically disconnected. Because the positive terminal 112 and the electric storage unit are electrically disconnected at this time, the current does not flow between the electric storage module 110 and the electric storage module 120 even if the voltage differential between the electric storage module 110 and the electric storage module 120 is relatively large. Subsequently, when the voltage differential between the electric storage module 110 and the electric storage module 120 has become an appropriate value, the system control unit 140 executes the operation for electrically connecting the electric storage module 110 and the wire 106. Note that the detail of the system control unit 140 will be described below.

As described above, according to the electric storage system 100 of the present embodiment, if an electric storage module is replaced or implemented, it is not necessary to strictly adjust the voltage of the electric storage module to be newly implemented in the electric storage system 100 and the voltage of the electric storage module already implemented in the electric storage system 100. Because of this, the electric storage module can be easily and quickly replaced or implemented.

The system control unit 140 controls each unit of the electric storage system 100. In an embodiment, the system control unit 140 decides the state of the electric storage system 100. Examples of the states of the electric storage system 100 include the state of charge, the state of discharge, the state of standby, or the state of stop.

For example, the system control unit 140 receives information related to a charge and discharge event and decides the state of the electric storage system 100 based on the information related to the charge and discharge event. Examples of the information related to the charge and discharge event include: (i) a charge request or a discharge request from an external apparatus such as the load device 12 and the charging device 14; (ii) information indicating that an external apparatus has been connected; (iii) information indicating the type of an external apparatus; (iv) information indicating operation of an external apparatus; (v) information indicating the state of an external apparatus; (vi) information indicating a user instruction or operation with respect to an external apparatus; (vii) information indicating a user instruction or operation with respect to the electric storage system 100; and (viii) the combination of the above.

For example, the system control unit 140 judges that the electric storage system 100 is in the state of discharge if the system control unit 140 has detected the connection of the load device 12 or received a signal indicating the type of the load device 12. The system control unit 140 may also judge that the electric storage system 100 is in the state of discharge upon receiving from the load device 12 a signal indicating that the power will be used. Examples of the signals indicating that the power will be used include a signal indicating that a power supply of the load device 12 will be turned on, a signal indicating that the power supply of the load device 12 has been turned on, a signal indicating that the load device 12 will be shifted to an operation mode, and a signal indicating that the load device 12 has shifted to the operation mode.

The system control unit 140 may judge that the electric storage system 100 is in the state of charge if the system control unit 140 has detected the connection of the charging device 14 or received a signal indicating the type of the charging device 14. The system control unit 140 may also judge that the electric storage system 100 is in the state of charge upon receiving from the charging device 14 a signal indicating that charging will start. The system control unit 140 may also judge that the electric storage system 100 is in the state of charge upon receiving from the load device 12 a signal indicating that a regenerative current has occurred or that a regenerative current may occur.

In another embodiment, the system control unit 140 monitors the state of each of the electric storage module 110 and the electric storage module 120. The system control unit 140 may collect information related to the battery characteristic of the electric storage unit included in each of the electric storage module 110 and the electric storage module 120. The information related to the battery characteristic of the electric storage unit may be at least one selected from: the voltage value of the electric storage unit; the current value of the current flowing through the electric storage unit; the battery capacity of the electric storage unit; the temperature of the electric storage unit; the deterioration state of the electric storage unit; and SOC (State Of Charge) of the electric storage unit.

The information related to the battery characteristic (in some cases, referred to as the battery characteristic of an electric storage module) of the electric storage unit may include at least one of information related to the specification of the electric storage unit and information related to the deterioration state of the electric storage unit. The battery characteristic of the electric storage unit may be a battery characteristic of one of a plurality of single batteries constituting the electric storage module or may be the battery characteristic of combination of the plurality of single batteries. Examples of the information related to the specification of the electric storage unit include information related to: the type or model of the electric storage unit; the connection state of the electric storage unit; the type of charging method that can charge the electric storage unit; the type of charging method that cannot charge the electric storage unit; the rated battery capacity (in some cases, referred to as the rated capacity); the rated voltage; the rated current; the energy density; the maximum charge and discharge current; the charge characteristic; the charge temperature characteristic; the discharge characteristic; the discharge temperature characteristic; the self-discharge characteristic; the charge and discharge cycle characteristic; the equivalent series resistance in the initial state; the battery capacity in the initial state; the SOC [%] in the initial state; and the electric storage voltage [V]. Examples of the charging methods include the CCCV charging method, the CC charging method, and the trickle charging method.

Examples of the connection states of the electric storage unit include the types, the number, and the connection forms of the unit cells constituting the electric storage unit. Examples of the connection forms of the unit cells include the number of the unit cells connected in series and the number of the unit cells connected in parallel. The energy density may be a volume energy density [Wh/m$^3$] or weight energy density [Wh/kg].

Examples of the information related to the deterioration state of the electric storage unit include information of the electric storage unit taken at an optional time, which include information related to: (i) the battery capacity in the state of full charge; (ii) SOC in a predetermined temperature condition; (iii) SOH (State Of Health); (iv) equivalent series resistance (in some cases referred to as DCR or internal resistance); and (v) at least one of the use time, the number of charging, the charge amount, the discharge amount, the number of charge and discharge cycles, a thermal stress factor, and an overcurrent stress factor that have been integrated since the initial state or a predetermined timing. The information related to the battery characteristic of the electric storage unit may also associate information related to the deterioration state of the electric storage unit with information related to the time of day that the information was acquired, and store the associated information. The information related to the battery characteristic of the electric storage unit may store information related to the deterioration state of the electric storage unit at a plurality of time of day.

SOH [%] is expressed, for example, as the full charge capacity in the deterioration state (for example, the present full charge capacity) [Ah]÷the initial full charge capacity [Ah]×100. Although the calculation methods or the estimation methods of SOH are not particularly limited, SOH of the electric storage unit is, for example, calculated or estimated based on at least one of the direct current resistance value and the open circuit voltage value of the electric storage unit. SOH may be a value in a predetermined temperature condition obtained from conversion using an optional conversion formula or the like.

The methods of determining the deterioration state of the electric storage unit are not particularly limited, and determination methods that are currently known or will be developed in the future may be used. In general, as the electric storage unit further deteriorates, the available battery capacity decreases while the equivalent series resistance increases. Because of this, for example, the deterioration state of a battery can be determined by comparing the present battery capacity, SOC, or the equivalent series resistance, with the battery capacity, SOC, or the equivalent series resistance of the initial state.

SOC [%] is expressed as, for example, the remaining capacity [Ah]÷the full charge capacity [Ah]×100. Although the calculation methods or the estimation methods of SOC are not particularly limited, SOC is, for example, calculated or estimated based on at least one of: (i) a measurement result of the voltage of the electric storage unit; (ii) I-V characteristic data of the voltage of the electric storage unit; and (iii) an integrated value of the current value of the electric storage unit. SOC may be a value in a predetermined temperature condition obtained from conversion using an optional conversion formula or the like.

The information related to the battery characteristic of the electric storage unit may be information related to at least one of the charge time and the discharge time of the electric storage unit. The charge time and the discharge time of the electric storage unit may respectively be the charge time and the discharge time of the electric storage module including the electric storage unit. In general, as the electric storage unit further deteriorates, the available battery capacity decreases and at least one of the charge time and the discharge time shortens.

Information related to the charge time of the electric storage unit may include information indicating the ratio of the charge time of the electric storage unit to the charge time of the electric storage system 100. The information related to the charge time of the electric storage unit may include information indicating the charge time of the electric storage system 100 and information indicating the charge time of the electric storage unit. The above described charge time may be: (i) time during which current or voltage has been applied to the electric storage system 100 or the electric storage unit in a single charging operation; or (ii) the sum of time during which current or voltage has been applied to the electric storage system 100 or the electric storage unit in one or more charging operations in a predetermined period.

The information related to the charge time of the electric storage unit may include information indicating the ratio of the number of charging of the electric storage unit in a predetermined period to the number of charging of the electric storage system 100 in the period. The information related to the charge time of the electric storage unit may include information indicating the number of charging of the electric storage system 100 in a predetermined period and information indicating the number of charging of the electric storage unit in the period.

The information related to the discharge time of the electric storage unit may include information indicating the ratio of the discharge time of the electric storage unit to the discharge time of the electric storage system 100. The information related to the discharge time of the electric storage unit may include the discharge time of the electric storage system 100 and the discharge time of the electric storage unit. The above described discharge time may be: (i) time during which the electric storage system 100 or the electric storage unit has supplied current or voltage in a single discharging operation; or (ii) the sum of time during which the electric storage system 100 or the electric storage unit has supplied current or voltage in one or more discharging operations in a predetermined period.

The information related to the discharge time of the electric storage unit may include information indicating the ratio of the number of discharging of the electric storage unit in a predetermined period to the number of discharging of the electric storage system 100 in the period. The information related to the discharge time of the electric storage unit may include the number of discharging of the electric storage system 100 in a predetermined period and the number of discharging of the electric storage unit in the period.

The system control unit 140 may transmit to an external apparatus at least one of the information related to the battery characteristic of the electric storage unit included in the electric storage module 110 and the information related to the battery characteristic of the electric storage unit included in the electric storage module 120. The external apparatus can thereby use the information related to the battery characteristic of an electric storage unit. Examples of the external apparatuses include the load device 12 and the charging device 14. The external apparatus may be an output device that outputs information to a user. Examples of the output devices include a display device and a voice output device such as a microphone. The output device may be an example of the output unit.

The system control unit 140 may determine the performance of the electric storage module based on the information related to the battery characteristic of the electric storage module. The system control unit 140 may also output information indicating that the performance of the electric storage module is insufficient if the battery characteristic of the electric storage module does not satisfy a predetermined determination condition. The system control unit 140 may also decide the determination condition based on the application of the electric storage system 100.

As described above, in the present embodiment, the system control unit 140 collects at least one of the information related to the battery characteristic of the electric storage unit included in the electric storage module 110 and the information related to the battery characteristic of the electric storage unit included in the electric storage module 120 and transmits the collected information to the external apparatus. However, the electric storage system 100 is not limited to the present embodiment. In another embodiment, each of the electric storage module 110 and the electric storage module 120 may also collect the information related to the battery characteristic of the electric storage unit included in the electric storage module and transmit the collected information to the external apparatus.

In the present embodiment, the system control unit 140 decides the order in which the electric storage unit of each electric storage modules is to be electrically connected to the wire 106, based on the voltage of the electric storage unit of each electric storage module. For example, if the state of the electric storage system 100 is in the state of charge when the operation of the electric storage system 100 is started, the system control unit 140 electrically connects to the wire 106 the electric storage units of the electric storage modules in the order of lowest to highest voltage of the electric storage units of the electric storage modules. On the other hand, if the state of the electric storage system 100 is in the state of discharge when the operation of the electric storage system 100 is started, the system control unit 140 electrically connects to the wire 106 the electric storage units of the electric storage modules in the order of highest to lowest voltage of the electric storage units of the electric storage modules. Note that the system control unit 140 may also decide the order in which the electric storage unit of each electric storage module is to be electrically connected to the wire 106, based on the terminal voltage of each electric storage module.

In an embodiment, the system control unit 140 may transmit to each electric storage module a signal for connecting the electric storage unit to the wire 106 in accordance with the decided order. In another embodiment, the system control unit 140 may also select the electric storage module having the lowest voltage or the smallest SOC, or select the electric storage module having the highest voltage or the largest SOC, and transmit only to the selected electric storage module a signal for connecting the electric storage unit to the wire 106.

The system control unit 140 may be realized by hardware, realized by software, or realized by hardware and software. Also, the system control unit 140 may be realized by combination of hardware and software. In an embodiment, the system control unit 140 may be realized by an analog circuit, a digital circuit, or combination of an analog circuit and a digital circuit. In another embodiment, in a general information processing device provided with a data processing device and the like having a CPU, a ROM, a RAM, a communication interface, and the like, the system control unit 140 may be realized by executing programs for controlling the respective units of the system control unit 140.

The programs installed in a computer to cause the computer to function as part of the system control unit 140 according to the present embodiment may include modules that define operations of the respective units of the system control unit 140. These programs or modules cooperate with CPU and the like to cause the computer to function as the respective units of the system control unit 140.

By being read by the computer, the information processing described in these programs functions as specific means as a result of the software and the above-described various types of hardware resources cooperating with each other. By realizing computation or processing of information to meet the intended use of the computer in the present embodiment by these specific means, a specific device to meet the intended use can be constructed. The programs may be stored on a computer-readable medium or a storage device connected to a network.

Note that the reference to 'electrically connected' is not limited to direct connection between a particular component and another component. A third component may also be present between the particular component and another component. Also, the reference to 'electrically connected' is not limited to physical connection between a particular component and another component. For example, input winding and output winding in a transformer are not physically connected but are electrically connected. Furthermore, the reference to 'electrically connected' means not only that a particular component is actually and electrically connected to another component but also that the particular component is electrically connected to the other component when an electric storage cell and a balance correcting unit are electrically connected. Also, the reference to 'connected in series' indicates that a particular component and another component are electrically connected in series, and the reference to 'connected in parallel' indicates that a particular component and another component are electrically connected in parallel.

As described above, in the present embodiment, the electric storage system 100 includes the two electric storage modules connected in parallel. However, the electric storage system 100 is not limited to the present embodiment. In another embodiment, the electric storage system 100 may also have three or more electric storage modules connected in parallel.

As described above, in the present embodiment, a user performs operation for electrically disconnecting the electric storage unit of the new electric storage module 110 and the wire 106 before implementing the electric storage module 110 in the electric storage system 100. However, the methods of implementing or replacing the electric storage module 110 are not limited to the present embodiment. In another embodiment, a user, for example, operates an input unit (not shown in the drawing) of the electric storage system 100 and inputs an instruction to start replacing the electric storage module 110. Examples of the input units include a keyboard, a pointing device, a touch panel, a microphone, a voice recognition system, and a gesture input system.

The system control unit 140 performs operation for electrically disconnecting the wire 106 and the electric storage unit of the electric storage module (the electric storage module 120 in the present embodiment) connected in parallel with the electric storage module 110 upon accepting an instruction to start replacing the electric storage module 110. At this time, the system control unit 140 may also perform operation for electrically disconnecting the electric storage unit of the electric storage module 110 and the wire 106. For example, the system control unit 140 transmits to the switching element a signal for turning off a switching element arranged between a positive terminal and the electric storage unit of each electric storage module.

The system control unit 140 acquires the voltage of the electric storage unit of each electric storage module upon detecting that the old electric storage module 110 has been detached and the new electric storage module 110 has been implemented. If the electric storage unit of the new electric storage module 110 and the wire 106 are electrically connected, the system control unit 140 operates the electric storage system 100 by using only the electric storage module 110 until the voltage differential between the electric storage module 110 and the electric storage module 120 becomes an appropriate value, for example. Then, when the voltage differential between the electric storage module 110 and the electric storage module 120 has become the appropriate value, the system control unit 140 executes operation for electrically connecting the electric storage module 120 and the wire 106.

On the other hand, if the electric storage unit of the new electric storage module 110 and the wire 106 are not electrically connected, the system control unit 140 decides the order in which the electric storage unit of each electric storage module is to be electrically connected to the wire 106, based on the voltage of the electric storage unit of each electric storage module. Subsequently, the system control unit 140 electrically connects the electric storage unit of each electric storage module to the wire 106 in accordance with the decided order. Note that, if the electric storage unit of the new electric storage module 110 and the wire 106 are electrically connected, the system control unit 140 may also first electrically disconnect the electric storage unit of the new electric storage module 110 and the wire 106. Subsequently, the system control unit 140 may also decide the order in which the electric storage unit of each electric storage module is to be electrically connected to the wire 106, based on the voltage of the electric storage unit of each electric storage module and then electrically connect the electric storage unit of each electric storage module to the wire 106 in accordance with the decided order.

Application Example of the Electric Storage System 100

As described above, according to the electric storage system 100 of the present embodiment, at least one of the electric storage module 110 and the electric storage module 120 that are connected in parallel with the load device 12 or the charging device 14 can be implemented or replaced at an optional timing without concerns about the voltage differential between the both electric storage modules. Here, the voltage differential between the electric storage module 110 and the electric storage module 120 may be caused not only by the difference with respect to the state of charge or the state of discharge of the both electric storage modules but also by the difference in the battery characteristics of the both electric storage modules. The battery characteristic of the electric storage module may be similar to the battery characteristic of the above described electric storage unit. The battery characteristic of the electric storage module may be at least one of the characteristics illustrated as the battery characteristics of the electric storage unit.

Because of this, according to the electric storage system 100 of the present embodiment, even if the battery characteristic of the electric storage module 110 and the battery characteristic of the electric storage module 120 are different, the electric storage module 110 and the electric storage module 120 can be connected in parallel with the load device 12 or the charging device 14, with the electric storage module 110 and the electric storage module 120 prevented from being deteriorated or damaged. Note that in the electric storage system 100 according to the present embodiment, the battery characteristic of the electric storage module 110 and the battery characteristic of the electric storage module 120 may be the same or different. If the electric storage module 110 and the electric storage module 120 include secondary batteries, the battery characteristic of the secondary battery constituting the electric storage unit of the electric storage module 110 and the battery characteristic of the secondary battery constituting the electric storage unit of the electric storage module 120 may be the same or different.

Also, a power supply system in which a plurality of power supply modules having the battery characteristics different from each other can be connected in parallel may also be constructed by a configuration similar to that of the electric storage system 100. Each power supply module can thereby be implemented or replaced at an optional timing, with deterioration or damage of each power supply module being suppressed. Employing the configuration similar to that of the electric storage system 100 is particularly useful to a system in which the power supply system is electrically connected to an external charging device or a load device by two terminals.

The power supply module may be an example of a power supply device that supplies power to another apparatus. The electric storage module 110 and the electric storage module 120 may be examples of the power supply modules. The electric storage system 100 may be an example of the power supply system in which a plurality of power supply devices are configured such that the power supply devices can be connected in parallel. The electric storage unit and the secondary battery may be examples of power supply units that serve as power supply sources for the power supply device.

The battery characteristic of the power supply device fluctuates due to factors such as: (i) the deterioration state of the power supply unit; (ii) the type of the power supply unit; and (iii) the state of balance between the capacity and SOC. According to an embodiment, a power supply system is provided in which a plurality of power supply devices having deterioration states different from each other can be connected in parallel. Although the detail of the above described power supply system will be described below, according to the embodiment, the power supply system can be constructed, for example, by using a secondhand power supply module (in some cases, referred to as used item, reused item, or the like).

According to another embodiment, a power supply system is provided in which different types of a plurality of power supply devices can be connected in parallel. This allows the power supply system to be constructed superior to a power supply system constructed by combining power supply devices of a single type, with respect to at least one of the life, the reliability, the charging performance, the discharging performance, the energy efficiency, the temperature characteristic, and the economy. The detail of the above described power supply system will be described below.

As described above, in the electric storage system 100 according to the present embodiment, the plurality of power supply modules constituting the electric storage system 100 are the electric storage module 110 and the electric storage module 120. However, the plurality of power supply modules constituting the electric storage system 100 are not limited to the present embodiment. In another embodiment, at least one of the plurality of power supply modules may include a primary battery or a fuel battery. In another embodiment, at least one of the plurality of power supply modules may include a primary battery or a fuel battery, and at least one of the plurality of power supply modules may include a secondary battery. The electric storage unit, the primary battery, and the fuel battery may be examples of the power supply units.

In these cases, by a configuration similar to that of the electric storage module 110 and that of the electric storage module 120, the power supply module including a primary battery or a fuel battery may switch the connection relationship between the primary battery or the fuel battery of the power supply module and the wire 106 based on a control signal from the system control unit 140 or the user operation. For example, the power supply module electrically connects the primary battery or the fuel battery of the power supply module and the wire 106 upon receiving from the system control unit 140 a signal indicating detection of the discharging operation. On the other hand, the power supply module disconnects the electrical connection relationship between the primary battery or the fuel battery of the power supply module and the wire 106 upon receiving from the system control unit 140 a signal indicating detection of the charging operation. The damage or deterioration of the primary battery or the fuel battery can thereby be prevented.

First Application Example of the Electric Storage System 100

In an embodiment, the electric storage system 100 includes a plurality of power supply devices. The plurality of power supply devices may include two power supply devices the power supply units of which have the deterioration states different from each other. The plurality of power supply devices may be connected in parallel with the load device 12 or the charging device 14. The electric storage system 100 may be electrically connected to the load device 12 or the charging device 14 by two terminals. At least one of the plurality of power supply devices may be held in the housing of the electric storage system 100 in an attachable and detachable manner. Each power supply device can thereby be individually replaced. The electric storage system 100 may include at least one electric storage module.

Examples of the power supply devices having different deterioration states include power supply devices having different use histories. For example, the electric storage system 100 has a new power supply device and a secondhand power supply device. The electric storage system 100 may also have a plurality of secondhand power supply devices having different use histories.

In recent years, there has been rapidly increasing demand for storage batteries to be used in electric storage devices and the like for applications that temporarily require a large current such as: (i) power source of electric vehicle, PHEV (Plug-in Hybrid Electric Vehicle), and the like; (ii) output stabilizing device for renewable energy; (iii) electric storage device for smart grid; (iv) electric storage device for storing power during the hours when the electricity charge is inexpensive; and (v) charging station. Also, the number of storage batteries having reached the renewal timing is increasing.

Here, the performance required for a storage battery differs depending on the application. Because of this, even if the storage battery used in a particular application deteriorates and no longer satisfies the performance required for the application, the storage battery can be reused by being diverted to another application in some cases. Also, as a result of the improvement in the performance of the storage battery, the life of the storage battery is longer than the life of a product incorporating the storage battery in some cases. Also in such cases, the storage battery is preferably reused and not discarded.

If the storage battery is reused, the deterioration state of each storage battery differs. Because of this, the battery characteristic of the storage battery has been conventionally tested before the storage battery is reused. Also, based on the test result, a power supply system has been constructed by combining storage batteries having the battery characteristics that satisfy a particular condition. However, in order to test the battery characteristic, the storage battery needs to be discharged after the storage battery has been full-charged, which requires efforts and time.

In contrast, according to the present embodiment, the electric storage system 100 in which a plurality of power supply devices having deterioration states different from each other are connected in parallel can easily be constructed. Also, each power supply device can individually be implemented or detached while the electric storage system 100 is operated. Furthermore, at least part of the test for the power supply device can be omitted before the power supply device to be reused is incorporated in the electric storage system 100.

According to the present embodiment, each power supply device can switch the connection relationship between its power supply unit and the wire 106 based on a control signal from the system control unit 140 or the user operation. The electric storage system 100 can thereby be safely operated even if the battery characteristic of the power supply device to be reused is not tested in advance. Also, the battery characteristic of the power supply device can be checked while the electric storage system 100 is operated. Then, if the battery characteristic of the power supply device is insufficient, the power supply device can easily be replaced.

Second Application Example of the Electric Storage System 100

In another embodiment, the electric storage system 100 includes a plurality of power supply devices. The plurality of power supply devices may include two power supply devices having different types of power supply units. The plurality of power supply devices may be connected in parallel with the load device 12 or the charging device 14. The electric storage system 100 may be electrically connected to the load device 12 or the charging device 14 by two terminals. At least one of the plurality of power supply devices may be held in the housing of the electric storage system 100 in an attachable and detachable manner. Each power supply device can thereby be individually replaced. The electric storage system 100 may include at least one electric storage module.

Examples of the types of the power supply units include a primary battery, a secondary battery, and a fuel battery. Examples of the types of the secondary batteries include a lithium battery, a lithium-ion battery, a lithium-sulfur battery, a sodium-sulfur battery, a lead-acid battery, a nickel-hydrogen battery, a nickel-cadmium battery, a redox flow battery, and a metal-air battery. The types of the lithium-ion batteries are not particularly limited. Examples of the types of the lithium-ion batteries include an iron phosphate based battery, a manganese based battery, a cobalt based battery, a nickel based battery, and a ternary based battery.

If the types of the power supply units included in the two power supply devices are different from each other, the difference between the rated voltages of the two power supply devices exceeds a predetermined value in some cases. Also, at least one of the difference between the charge characteristics and the difference between the discharge characteristics of the two power supply devices does not satisfy the predetermined condition in some cases. Conventionally, the power supply system has been constructed by finding power supply devices that match a particular condition and combining them. Because of this, there has been no concept of connecting two of such power supply devices in parallel.

In contrast, according to the present embodiment, the electric storage system 100 in which a plurality of power supply devices of different types are connected in parallel can easily be constructed. Also, each power supply device can individually be implemented or detached while the electric storage system 100 is operated.

Furthermore, at the time of the charging operation of the electric storage system 100, the electrical connection relationship between the power supply unit and the load device 12 or the charging device 14 can be disconnected, depending on the type of the power supply unit included in the power supply device.

According to the present embodiment, each power supply device can switch the connection relationship between its power supply unit and the wire 106 based on a control signal from the system control unit 140 or the user operation. The electric storage system 100 can thereby be safely operated if the difference between the rated voltages of the two power supply devices included in the electric storage system 100 exceeds a predetermined value or even if at least one of the difference between the charge characteristics and the difference between the discharge characteristics of the two power supply devices does not satisfy the predetermined condition.

Also, according to the present embodiment, the power supply system can be constructed superior to a power supply system constructed by combining power supply devices of a single type with respect to at least one of the life, the reliability, the charging performance, the discharging performance, the energy efficiency, the temperature characteristic, and the economy. For example, the power supply system that has a high energy efficiency and also operates in a wide temperature range can be constructed by combining: (i) the power supply module including a lead-acid battery that operates in a relatively wide temperature range but has relatively low energy efficiency in charging and discharging; and (ii) the power supply module including a lithium-ion battery that has a high energy efficiency in charging and discharging but has a problem in operating in low and high temperature regions.

Figure 2:
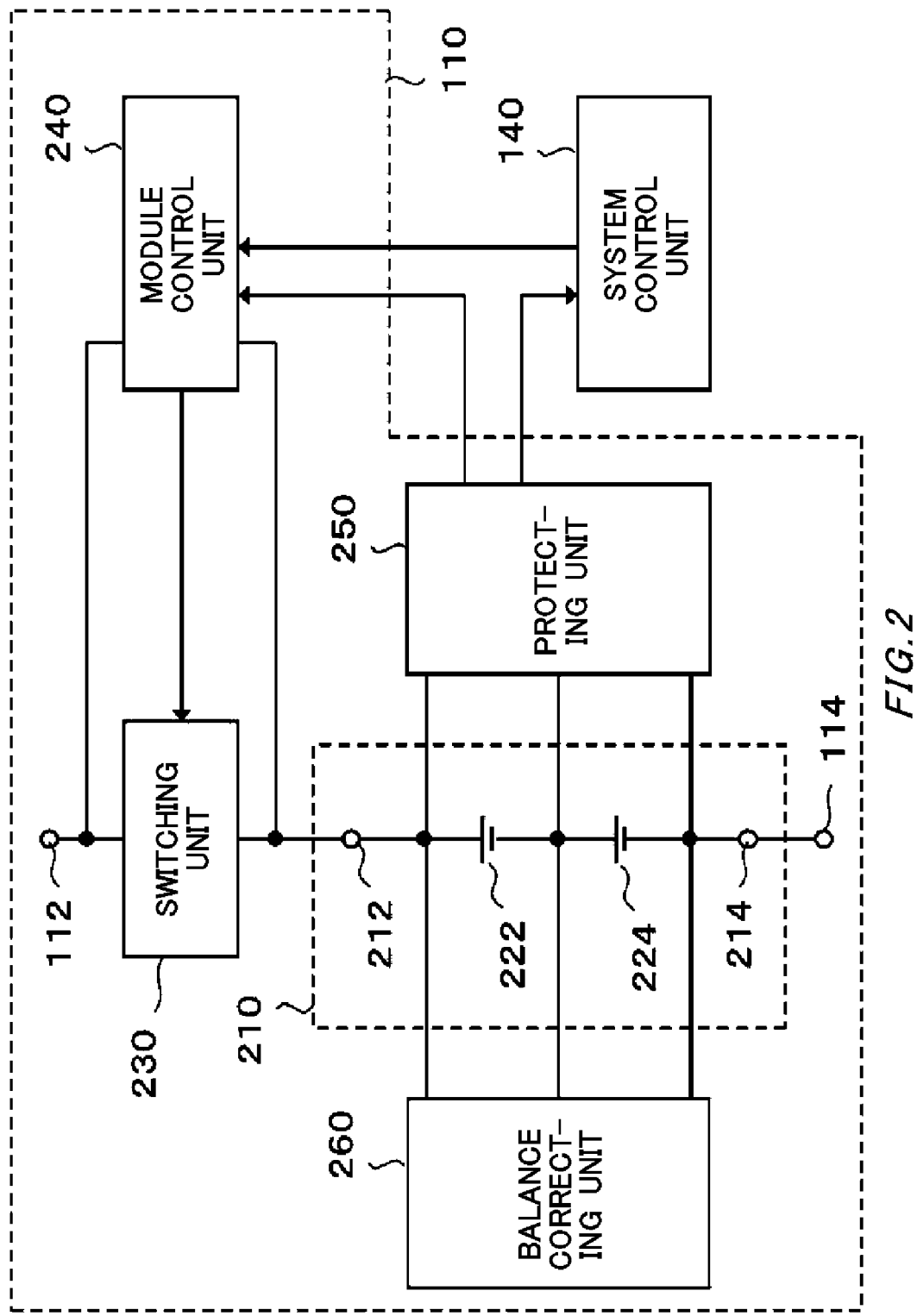
FIG. 2 schematically shows an example of a system configuration of an electric storage module 110.

FIG. 2 schematically shows an example of a system configuration of the electric storage module 110. In the present embodiment, the electric storage module 110 includes the electric storage unit 210 that has a positive terminal 212 and a negative terminal 214, a switching unit 230, a module control unit 240, a protecting unit 250, and a balance correcting unit 260. Also, in the present embodiment, the electric storage unit 210 includes an electric storage cell 222 and an electric storage cell 224. The switching unit 230 may be an example of the switching element. The module control unit 240 may be an example of a control unit. The module control unit 240 may be an example of a control device. The module control unit 240 may be an example of the battery characteristic acquiring unit. The module control unit 240 may be an example of the output unit.

The impedance of the electric storage unit 210 may be equal to or lower than 100 mΩ. The impedance of the electric storage unit 210 may be equal to or lower than 10 mΩ, equal to or lower than 1 mΩ, equal to or lower than 0.8 mΩ, or equal to or lower than 0.5 mΩ. The impedance of the electric storage unit 210 may be equal to or higher than 0.1 mΩ. The impedance of the electric storage unit 210 may be equal to or higher than 0.1 mΩ and equal to or lower than 100 mΩ, may be equal to or higher than 0.1 mΩ and equal to or lower than 10 mΩ, or may be equal to or higher than 0.1 mΩ and equal to or lower than 1 mΩ.

According to the electric storage system 100 of the present embodiment, for example, if one of the plurality of electric storage modules connected in parallel is replaced, the voltage of the electric storage module to be newly added to the electric storage system and the voltage of the remaining electric storage module may not match each other with high precision. Because of this, the electric storage module 110 can be easily and quickly replaced even if the impedance of the electric storage unit 210 is small.

In the present embodiment, the electric storage cell 222 and the electric storage cell 224 are connected in series. The electric storage cell 222 and the electric storage cell 224 may be secondary batteries or capacitors. At least one of the electric storage cell 222 and the electric storage cell 224 may be a lithium-ion battery. At least one of the electric storage cell 222 and the electric storage cell 224 may further include a plurality of electric storage cells connected in series, in parallel, or in a matrix inside the electric storage cell.

In the present embodiment, the positive terminal 212 of the electric storage unit 210 is electrically connected to the wire 106 via the positive terminal 112 and the switching unit 230 of the electric storage module 110. On the other hand, the negative terminal 214 of the electric storage unit 210 is electrically connected to the wire 106 via the negative terminal 114 of the electric storage module 110. However, the electric storage module 110 is not limited to the present embodiment. In another embodiment, the negative terminal 214 of the electric storage unit 210 is electrically connected to the wire 106 via the negative terminal 114 and the switching unit 230 of the electric storage module 110. On the other hand, the positive terminal 212 of the electric storage unit 210 is electrically connected to the wire 106 via the positive terminal 112 of the electric storage module 110.

The switching unit 230 is arranged between the wire 106 and the electric storage unit 210. In the present embodiment, the switching unit 230 switches the connection state of the wire 106 and the electric storage unit 210 based on a signal generated by the module control unit 240. The electric storage unit 210 can thereby be electrically connected to the wire 106 or electrically disconnected from the wire 106. If the electric storage module 110 is implemented in the electric storage system 100, the electric storage module 110 may be loaded into the electric storage system 100, with the electric storage unit 210 and the wire 106 electrically disconnected by the switching unit 230. The damage or deterioration of the electric storage module 110 can thereby be prevented.

The switching unit 230 may be realized by hardware, realized by software, or realized by combination of hardware and software. The switching unit 230 may be realized by an analog circuit, a digital circuit, or combination of an analog circuit and a digital circuit. The switching unit 230 may have one or more elements. The switching unit 230 may also have one or more switching elements. Each of the one or more switching elements may be arranged between the positive terminal 112 and the positive terminal 212 or between the negative terminal 114 and the negative terminal 214. Examples of the switching elements include a relay, a thyristor, and a transistor. The thyristor may be a bi-directional thyristor (in some cases, referred to as triac). The transistor may be a semiconductor transistor. The semiconductor transistor may be a bipolar transistor or a field effect transistor. The field effect transistor may be a MOSFET.

The module control unit 240 controls the current flowing between the electric storage unit 210 of the electric storage module 110 and the wire 106. In the present embodiment, if the terminal voltage of the switching unit 230 (the voltage between the positive terminal 112 and the positive terminal 212 in the present embodiment) satisfies a predetermined condition, the module control unit 240 controls the switching unit 230 such that the switching unit 230 electrically connects the electric storage unit 210 and the wire 106. The switching unit 230 may electrically connect the electric storage unit 210 and the wire 106 by electrically connecting the electric storage unit 210 and the positive terminal 112.

On the other hand, if the terminal voltage of the switching unit 230 does not satisfy the predetermined condition, the module control unit 240 controls the switching unit 230 such that the switching unit 230 electrically disconnects the electric storage unit 210 and the wire 106 or disconnects the electric storage unit 210 and the positive terminal 112. The switching unit 230 may electrically disconnect the electric storage unit 210 and the wire 106 by electrically disconnecting the electric storage unit 210 and the positive terminal 112.

The predetermined condition may be a condition that the absolute value of the terminal voltage of the switching unit 230 is within a predetermined range. The predetermined range may be equal to or lower than 1 V, equal to or lower than 0.1 V, equal to or lower than 10 mV, or equal to or lower than 1 mV. Also, the predetermined range may be equal to or higher than 1 mV and equal to or lower than 1 V, may be equal to or higher than 1 mV and equal to or lower than 0.1 V, may be equal to or higher than 1 mV and equal to or lower than 10 mV, may be equal to or higher than 10 mV and equal to or lower than 1 V, may be equal to or higher than 10 mV and equal to or lower than 0.1 V, or equal to or higher than 0.1 V and equal to or lower than 1 V. Note that the terminal voltage of the switching unit 230 may be the voltage between the positive terminal 112 and the positive terminal 212 or the voltage between the wire 106 and the electric storage unit 210.

The predetermined range may be set based on the impedance of the electric storage unit 210. The predetermined range may be set based on the rated current or allowable current of the electric storage unit 210. The predetermined range may be set based on the impedance of the electric storage unit 210 and on the rated current or allowable current of the electric storage unit 210. The predetermined range may be set based on the rated current or allowable current of an element that is included in elements constituting the electric storage module 110 and has the lowest rated current or allowable current. The predetermined range may be set based on the impedance of the electric storage module 110 and on the rated current or allowable current of the element that is included in the elements constituting the electric storage module 110 and has the lowest rated current or allowable current.

If the electric storage module is replaced, the wire 106 and the electric storage unit 210 of the newly implemented electric storage module can thereby be maintained electrically disconnected until the voltage differential between the newly implemented electric storage module and the already implemented electric storage module falls within the predetermined range. Then, when the voltage differential between the newly implemented electric storage module and the already implemented electric storage module have fallen within the predetermined range by charging or discharging the already implemented electric storage module, the electric storage unit of the newly implemented electric storage module is electrically connected to the wire 106. In this way, according to the present embodiment, the newly implemented electric storage module and the other electric storage module can be automatically connected.

In the present embodiment, the module control unit 240 receives from the system control unit 140 a signal indicating that the terminal voltage of the electric storage module 110 is lower than the terminal voltage of the other electric storage module. If the module control unit 240 receives the above described signal when the electric storage system 100 shifts to the state of charge, the module control unit 240 controls the switching unit 230 such that the switching unit 230 electrically connects the electric storage unit 210 and the wire 106. The plurality of electric storage modules 110 connected in parallel can thereby be efficiently charged.

In the present embodiment, the module control unit 240 receives from the system control unit 140 a signal indicating that the terminal voltage of the electric storage module 110 is higher than the terminal voltage of the other electric storage module. If the module control unit 240 receives the above described signal when the electric storage system 100 shifts to the state of discharge, the module control unit 240 controls the switching unit 230 such that the switching unit 230 electrically connects the electric storage unit 210 and the wire 106. The plurality of electric storage modules 110 connected in parallel can thereby be efficiently discharged.

In the present embodiment, the module control unit 240 receives from the protecting unit 250 a signal indicating that the terminal voltage of the electric storage cell 222 or the terminal voltage of the electric storage cell 224 is not in the predetermined range. When the module control unit 240 has received the signal, the module control unit 240 controls the switching unit 230 such that the switching unit 230 electrically disconnects the electric storage unit 210 and the wire 106. The deterioration or damage of the electric storage unit 210 due to overcharge or over discharge can thereby be suppressed.

In the present embodiment, the module control unit 240 accepts user operation and receives an instruction for turning on or turning off the switching unit 230 from the user. When the module control unit 240 has received the instruction from the user, the module control unit 240 controls the switching unit 230 in accordance with the instruction.

In the present embodiment, the module control unit 240 may acquire information related to the battery characteristic of the electric storage unit 210. The module control unit 240 may output to an external apparatus the information related to the battery characteristic of the electric storage unit 210. The external apparatus can thereby use the information related to the battery characteristic of the electric storage unit 210. Examples of the external apparatuses include the load device 12 and the charging device 14. The external apparatus may be an output device that outputs information to a user.

The module control unit 240 may be realized by hardware or realized by software. Also, the module control unit 240 may be realized by combination of hardware and software.

In an embodiment, the module control unit 240 may be realized by an analog circuit, a digital circuit, or combination of an analog circuit and a digital circuit. In another embodiment, in a general information processing device provided with a data processing device and the like having a CPU, a ROM, a RAM, an communication interface, and the like, the module control unit 240 may be realized by executing a program for controlling the module control unit 240.

The programs installed into a computer to cause the computer to function as part of the module control unit 240 according to the present embodiment may include modules that define operations of the respective units of the module control unit 240. These programs or modules cooperate with CPU or the like to cause the computer to function as the respective units of the module control unit 240.

By being read by the computer, the information processing described in these programs functions as specific means as a result of the software and the above-described various types of hardware resources cooperating with each other. By realizing computation or processing of information to meet the intended use of the computer in the present embodiment by these specific means, a specific device to meet the intended use can be constructed. The programs may be stored on a computer-readable medium or a storage device connected to a network. The computer-readable medium may be a non-transitory computer-readable medium.

The protecting unit 250 protects the electric storage unit 210. In the present embodiment, the protecting unit 250 protects the electric storage unit 210 from overcharge and over discharge. When the protecting unit 250 has detected that the terminal voltage of the electric storage cell 222 or the terminal voltage of the electric storage cell 224 is not in the predetermined range, the protecting unit 250 transmits to the module control unit 240 a signal indicating the content of the detection. The protecting unit 250 may transmit to the system control unit 140 the information related to the terminal voltage of the electric storage unit 210. The protecting unit 250 may be realized by hardware, realized by software, or realized by combination of hardware and software. The protecting unit 250 may be realized by an analog circuit, a digital circuit, or combination of an analog circuit and a digital circuit.

The balance correcting unit 260 equalizes the voltage of the plurality of electric storage cells. The operating principle of the balance correcting unit 260 is not particularly limited, and an optional balance correcting device can be used. If the electric storage unit 210 has three or more electric storage cells, the electric storage module 110 may have a plurality of balance correcting units 260. For example, if the electric storage unit 210 has n (n is an integer equal to or larger than 2) electric storage cells, the electric storage module 110 has n-1 balance correcting unit(s) 260.

The balance correcting unit 260 may be realized by hardware, realized by software, or realized by combination of hardware and software. The balance correcting unit 260 may be realized by an analog circuit, a digital circuit, or combination of an analog circuit and a digital circuit. In an embodiment, the balance correcting unit 260 is an active-type balance correcting device. The active-type balance correcting unit may be a balance correcting unit that transfers electric charges between two electric storage cells via an inductor as described in Japanese Patent Application Publication No. 2006-067742. Also, the active-type balance correcting unit may be a balance correcting unit that transfers electric charges via a capacitor as described in Japanese Patent Application Publication No. 2012-210109. In another embodiment, the balance correcting unit 260 may be a passive-type balance correcting device. The passive-type balance correcting device releases extra electric charges by using an external resistor, for example.

As described above, in the present embodiment, the electric storage unit 210 has the two electric storage cells connected in series. However, the electric storage unit 210 is not limited to the present embodiment. In another embodiment, the electric storage unit 210 may also have three or more electric storage cells connected in series. Also, the electric storage unit 210 may have a plurality of electric storage cells connected in parallel or a plurality of electric storage cells connected in a matrix.

Figure 3:
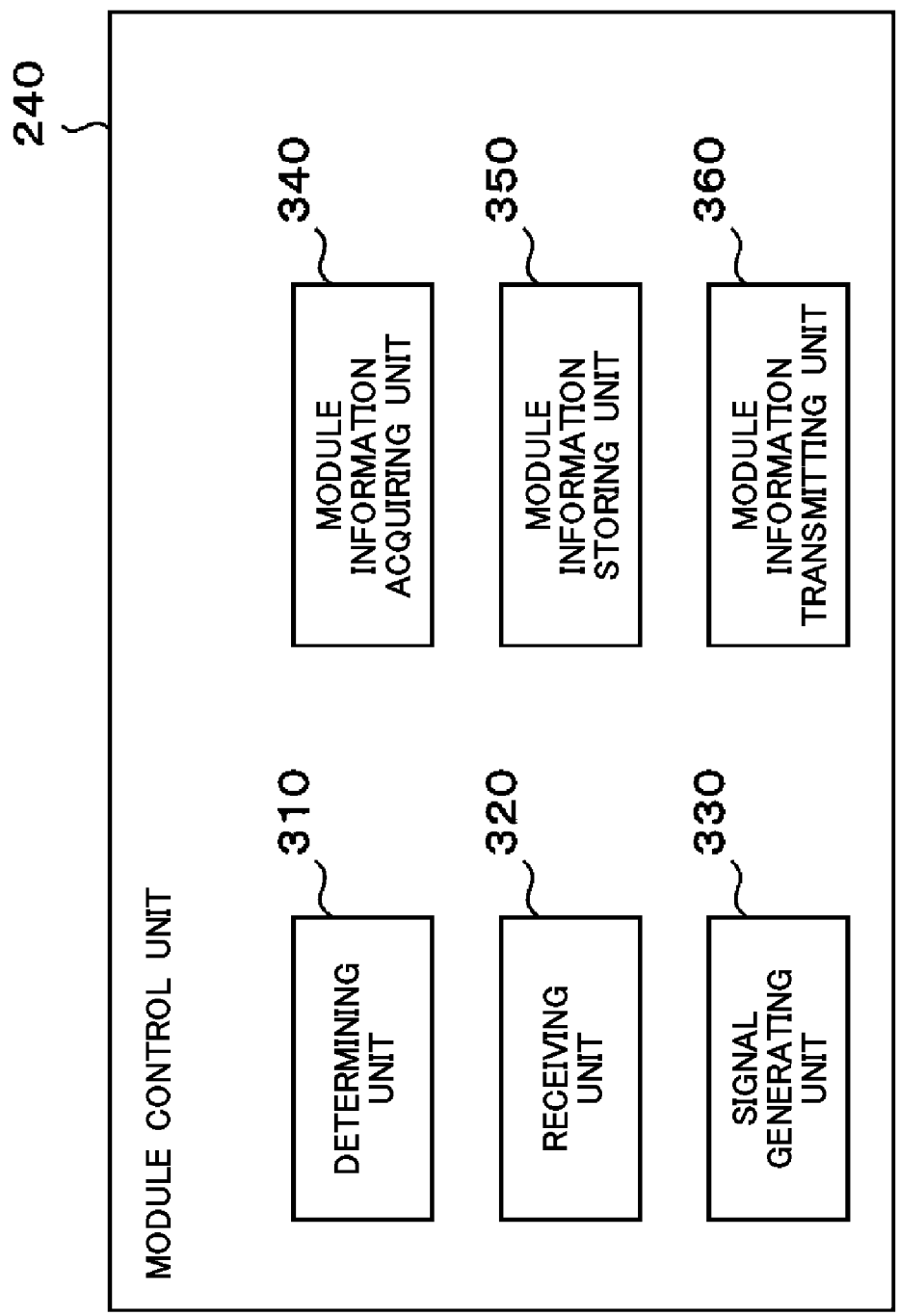
FIG. 3 schematically shows an example of a system configuration of a module control unit 240.

FIG. 3 schematically shows an example of a system configuration of the module control unit 240. In the present embodiment, the module control unit 240 includes a determining unit 310, a receiving unit 320, and a signal generating unit 330. The module control unit 240 may also include a module information acquiring unit 340, a module information storing unit 350, and a module information transmitting unit 360. The receiving unit 320 may be an example of the first signal receiving unit, second signal receiving unit, and third signal receiving unit. The module information acquiring unit 340 may be an example of the battery characteristic acquiring unit. The module information transmitting unit 360 may be an example of the output unit.

As described in the present embodiment, the module control unit 240 includes the module information acquiring unit 340, the module information storing unit 350, and the module information transmitting unit 360. However, the electric storage system 100 is not limited to the present embodiment. In another embodiment, the system control unit 140 may also include at least one of the module information acquiring unit 340, the module information storing unit 350, and the module information transmitting unit 360.

The determining unit 310 determines whether or not the terminal voltage of the switching unit 230 is within a predetermined range. The determining unit 310 transmits to the signal generating unit 330 a signal indicating the determination result. The determining unit 310 may be an optional comparator or a comparator circuit. The determining unit 310 may be a window comparator.

The receiving unit 320 receives at least one of a signal from the system control unit 140, a signal from the protecting unit 250, and an instruction from a user. The receiving unit 320 transmits to the signal generating unit 330 a signal corresponding to the receive information.

The signal generating unit 330 receives the signal from at least one of the determining unit 310 and the receiving unit 320. The signal generating unit 330 generates a signal for controlling the switching unit 230 based on the received information. The signal generating unit 330 transmits the generated signal to the switching unit 230.

In an embodiment, if the determining unit 310 has determined that the terminal voltage of the switching unit 230 is within a predetermined range, the signal generating unit 330 generates a signal for turning on the switching element of the switching unit 230. In another embodiment, if the determining unit 310 has determined that the terminal voltage of the switching unit 230 is not in the predetermined range, the signal generating unit 330 generates a signal for turning off the switching element of the switching unit 230.

The signal generating unit 330 may generate or transmit a signal subsequent to the passage of a predetermined amount of time after the determining unit 310 determines whether or not the terminal voltage of the switching unit 230 is within the predetermined range. The malfunction due to noise or the like can thereby be prevented. Also, the electric storage unit 210 and the wire 106 can be prevented from being electrically connected immediate after the electric storage module 110 is loaded into the electric storage system 100.

In the present embodiment, the signal generating unit 330 generates a signal for controlling the switching element of the switching unit 230 based on a signal received by the receiving unit 320. In an embodiment, if the receiving unit 320 has received from the system control unit 140 a signal for turning on the switching element of the switching unit 230, the signal generating unit 330 generates a signal for turning on the switching element of the switching unit 230.

In another embodiment, if the receiving unit 320 has received from the protecting unit 250 a signal for turning off the switching element of the switching unit 230, the signal generating unit 330 generates a signal for turning off the switching element of the switching unit 230. Furthermore, in another embodiment, if the receiving unit 320 has accepted an instruction from a user, the signal generating unit 330 generates a signal for causing the switching element of the switching unit 230 to operate as instructed by the user.

In the present embodiment, the module information acquiring unit 340 acquires the information related to the battery characteristic of the electric storage unit 210. The module information acquiring unit 340 may also acquire the information related to the battery characteristic of the electric storage unit 210 by measuring the battery characteristic of the electric storage unit 210. The module information acquiring unit 340 may also acquire information that is input by a manufacturer, a seller, or the like at the time of shipping, testing, or selling and is related to the battery characteristic of the electric storage unit 210.

The module information acquiring unit 340 may store the information related to the battery characteristic of the electric storage unit 210 in the module information storing unit 350. Although the specific configuration of the module information acquiring unit 340 is not particularly limited, the module information acquiring unit 340 may be a controller that controls reading data from and writing data into the module information storing unit 350. In the present embodiment, the module information storing unit 350 stores the information that has been acquired by the module information acquiring unit 340 and is related to the battery characteristic of the electric storage unit 210.

In the present embodiment, the module information transmitting unit 360 transmits to the system control unit 140 the information that has been acquired by the module information acquiring unit 340 and is related to the battery characteristic of the electric storage unit 210. The module information transmitting unit 360 may also transmit to an external apparatus the information that has been acquired by the module information acquiring unit 340 and is related to the battery characteristic of the electric storage unit 210. The module information transmitting unit 360 may transmit the information related to the battery characteristic of the electric storage unit 210 in response to a request by the external apparatus or transmit the information related to the battery characteristic of the electric storage unit 210 at a predetermined timing. The module information transmitting unit 360 may also refer to the module information storing unit 350 and transmit to the system control unit 140 or the external apparatus the information related to the battery characteristic of the electric storage unit 210.

Figure 4:
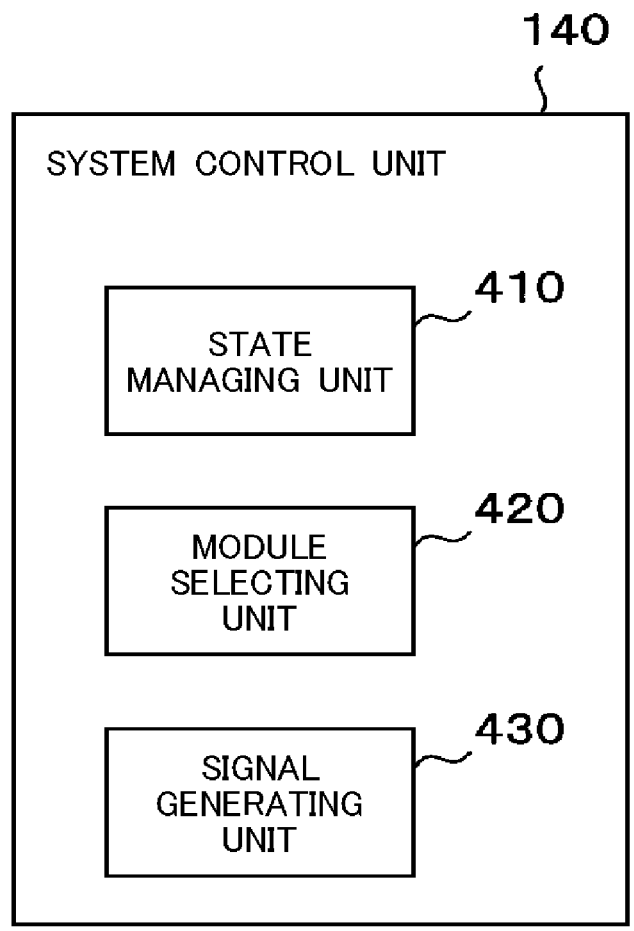
FIG. 4 schematically shows an example of a system configuration of a system control unit 140.

FIG. 4 schematically shows an example of a system configuration of the system control unit 140. In the present embodiment, the system control unit 140 includes a state managing unit 410, a module selecting unit 420, and a signal generating unit 430. The state managing unit 410 may be an example of the battery characteristic acquiring unit. The state managing unit 410 may be an example of the output unit.

In the present embodiment, the state managing unit 410 manages the state of the electric storage system 100. The state managing unit 410 may manage the state of the electric storage module 110 and the state of the electric storage module 120. The state managing unit 410 may monitor the state of each of the electric storage module 110 and the electric storage module 120. The state managing unit 410 may monitor the electric storage module 110 and the electric storage module 120 and also acquire information related to the battery characteristic of each of the electric storage module 110 and the electric storage module 120. The state managing unit 410 may also transmit to an external apparatus the information acquired by monitoring the electric storage module 110 and the electric storage module 120.

The state managing unit 410 may measure the battery characteristic of each electric storage module while the electric storage system 100 is operated. If the battery characteristic of the electric storage module does not satisfy a predetermined condition, the state managing unit 410 may output information indicating that the performance of the electric storage module is insufficient, to an output device that outputs information to a user. The state managing unit 410 may also output identification information of the electric storage module and the information indicating that the performance of the electric storage module is insufficient.

The user can thereby easily distinguish the electric storage module having the insufficient performance and can replace the electric storage module. According to the present embodiment, for example, if the electric storage system 100 is constructed using a reused electric storage module(s), at least part of the test for the electric storage module to be reused can be omitted.

In an embodiment, when the electric storage system 100 shifts to the state of charge, the module selecting unit 420 selects an electric storage module that is included in the plurality of electric storage modules in the electric storage system 100 and has the lowest terminal voltage. For example, the module selecting unit 420 compares the terminal voltage of the electric storage module 110 and the terminal voltage of the electric storage module 120 and then selects the electric storage module having the lower terminal voltage. The module selecting unit 420 transmits to the signal generating unit 430 a signal indicating the selected electric storage module.

In another embodiment, when the electric storage system 100 shifts to the state of discharge, the module selecting unit 420 selects the electric storage module that is included in the plurality of electric storage modules in the electric storage system 100 and has the highest terminal voltage. For example, the module selecting unit 420 compares the terminal voltage of the electric storage module 110 and the terminal voltage of the electric storage module 120 and then selects the electric storage module having the higher terminal voltage. The module selecting unit 420 transmits to the signal generating unit 430 a signal indicating the selected electric storage module.

In the present embodiment, the signal generating unit 430 generates a signal for turning on the switching element of the switching unit 230 in the electric storage module selected by the module selecting unit 420. The signal generating unit 430 transmits the generated signal to the module control unit 240. In another embodiment, the signal generating unit 430 may also generate a signal for turning off the switching element of the switching unit 230 in the electric storage module selected by the module selecting unit 420.

Figure 5:
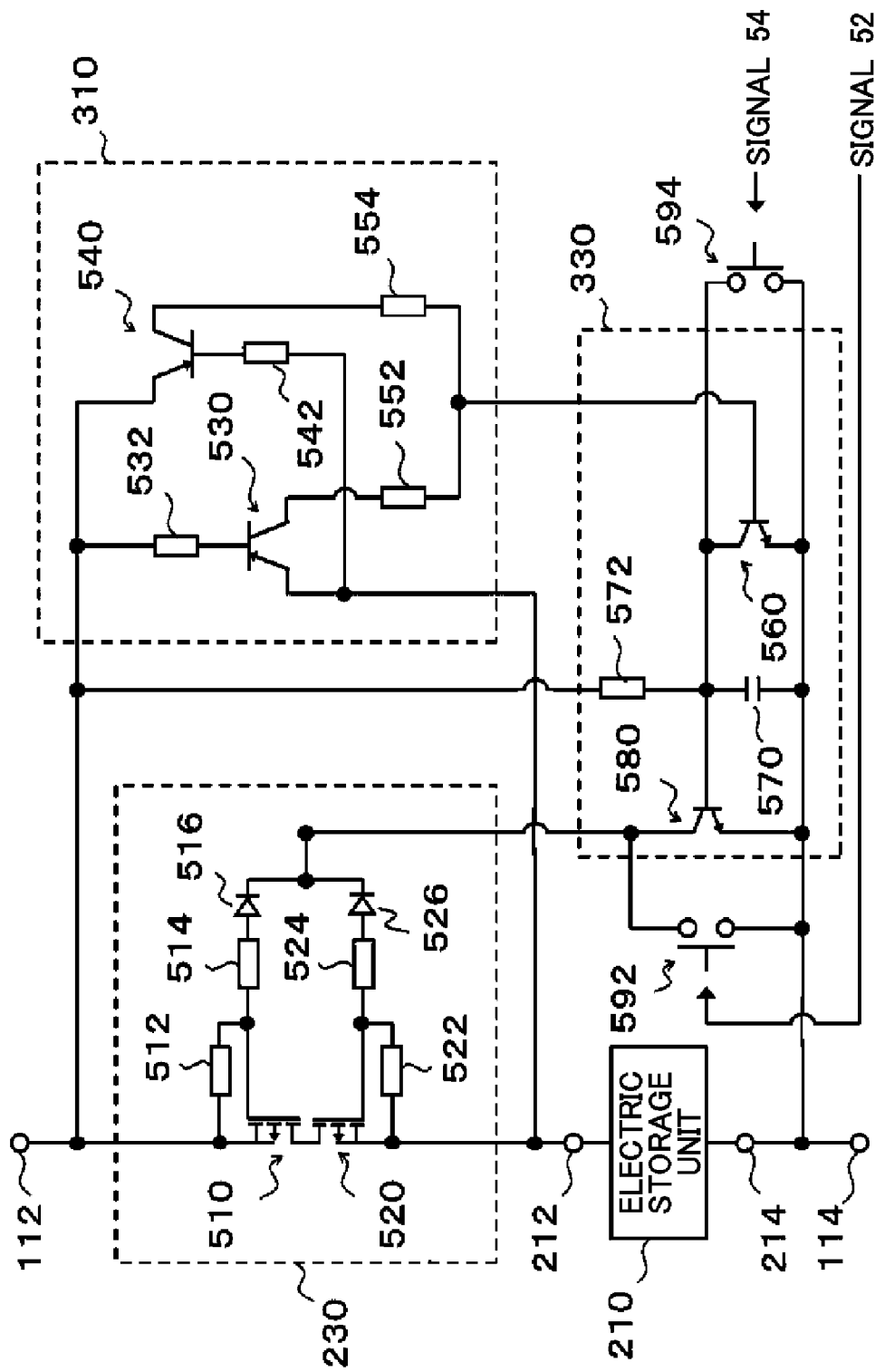
FIG. 5 schematically shows an example of a circuit configuration of the electric storage module 110.

FIG. 5 schematically shows an example of a circuit configuration of the electric storage module 110. Note that FIG. 5 does not show the protecting unit 250 and wires associated to the protecting unit 250 in order to simplify explanation.

In the present embodiment, the switching unit 230 includes a transistor 510, a resistor 512, a resistor 514, a diode 516, a transistor 520, a resistor 522, a resistor 524, and a diode 526. The transistor 510 and the transistor 520 may be examples of the switching element. As described in the present embodiment, the transistor 510 and the transistor 520 are used as the switching elements of the switching unit 230. However, the switching element of the switching unit 230 is not limited to the present embodiment. In another embodiment, a single switching element may be used as the switching element of the switching unit 230.

In the present embodiment, the module control unit 240 includes the determining unit 310, the signal generating unit 330, a switch 592, and a switch 594. In the present embodiment, the determining unit 310 includes a transistor 530, a resistor 532, a transistor 540, a resistor 542, a resistor 552, and a resistor 554. The signal generating unit 330 includes a transistor 560, a capacitor 570, a resistor 572, and a transistor 580. The switch 592 and the switch 594 may be examples of the receiving unit 320.

The detail of each unit of the switching unit 230 and the module control unit 240 will be described below. In the switching unit 230 of the present embodiment, the transistor 510 is a MOSFET, and even if the transistor 510 is in the OFF state, the current may flow from the positive terminal 212 to the positive terminal 112 due to a parasitic diode (not shown in the drawing) equivalently formed between the source and drain of the transistor 510. Similarly, the transistor 520 is a MOSFET, and even if the transistor 520 is in the OFF state, the current may flow from the positive terminal 112 to the positive terminal 212 due to a parasitic diode (not shown in the drawing) equivalently formed between the source and drain of the transistor 520.

In the present embodiment, the transistor 510 and the transistor 520 are set to the OFF state at the initial setting. If the transistor 580 is turned on when the electric storage system 100 is charged, the current flows from the positive terminal 112 to the negative terminal 114 via the resistor 512, the resistor 514, and the transistor 580. As a result, the voltage is applied to the gate of the transistor 510, and the transistor 510 is turned on. The current is thereby allowed to flow from the positive terminal 112 to the positive terminal 212 via the parasitic diode equivalently formed between the source and drain of the transistor 520.

On the other hand, if the transistor 580 is turned on when the electric storage system 100 is discharged, the current flows from the positive terminal 212 to the negative terminal 214 via the resistor 522, the resistor 524, and the transistor 580. As a result, the voltage is applied to the gate of the transistor 520, and the transistor 520 is turned on. The current is thereby allowed to flow from the positive terminal 212 to the positive terminal 112 via the parasitic diode equivalently formed between the source and drain of the transistor 510.

The voltage that is applied to the gate of the transistor 510 or the gate of the transistor 520, with the transistor 580 turned on, may be an example of a signal for turning on the switching element of the switching unit 230. Similarly, the voltage that is applied to the gate of the transistor 510 or the gate of the transistor 520, with the transistor 580 turned off, may be an example of a signal for turning off the switching element of the switching unit 230.

In the present embodiment, the values of the resistor 512 and the resistor 514 are set such that the transistor 510 can certainly be turned on and off in a power saving manner. Also, the values of the resistor 522 and the resistor 524 are set such that the transistor 520 can certainly be turned on and off in a power saving manner.

In the present embodiment, the diode 516 is arranged between the resistor 514 and the resistor 524. The diode 516 allows the current to flow in a direction from the resistor 514 toward the resistor 524 but does not allow the current to flow in a direction from the resistor 524 toward the resistor 514. By providing the diode 516, the current can be prevented from leaking from the positive terminal 212 to the positive terminal 112 through the route of the resistor 522, the resistor 524, the resistor 514, and the resistor 512 when the switching unit 230 electrically disconnects the positive terminal 112 and the positive terminal 212.

In the present embodiment, the diode 526 is arranged between the resistor 514 and the resistor 524. The diode 526 allows the current to flow in the direction from the resistor 524 toward the resistor 514 but does not allow the current to flow in the direction from the resistor 514 toward the resistor 524. By providing the diode 526, the current can be prevented from leaking from the positive terminal 112 to the positive terminal 212 through the route of the resistor 512, the resistor 514, the resistor 524, and the resistor 522 when the switching unit 230 electrically disconnects the positive terminal 112 and the positive terminal 212.

In the module control unit 240 of the present embodiment, the transistor 530 and the transistor 540 of the determining unit 310 are set to the OFF state at the initial setting. Also, the transistor 560 and the transistor 580 of the signal generating unit 330 are set to the OFF state at the initial setting.

According to the present embodiment, if the terminal voltage of the switching unit 230 is lower than a first value, which is predetermined such that the positive terminal 112 side is set positive, the value of the resistor 532 is set such that the transistor 530 is turned on. The value of the resistor 532 is preferably set such that the current that leaks when the switching unit 230 is in the OFF state becomes very small. Also, the value of the resistor 542 is set such that the transistor 540 is turned on if the terminal voltage of the switching unit 230 is higher than a predetermined second value. The value of the resistor 542 is preferably set such that the current that leaks when the switching unit 230 is in the OFF state becomes very small. Note that, according to the present embodiment, the terminal voltage of the switching unit 230 is equal to the voltage differential between the positive terminal 112 and the positive terminal 212.

If the terminal voltage of the switching unit 230 is lower than the predetermined first value, the transistor 530 is turned on, and the voltage is applied from the electric storage unit 210 to the base of the transistor 560 via the positive terminal 212, transistor 530, and the resistor 552. Accordingly, the transistor 560 is turned on. Although the voltage from the positive terminal 112 is applied to the base of the transistor 580, the transistor 580 is prevented from being turned on while the transistor 560 is turned on. As a result, the transistor 580 is turned off.

On the other hand, if the terminal voltage of the switching unit 230 is higher than the predetermined the second value, the transistor 540 is turned on, and the voltage is applied from the positive terminal 112 to the base of the transistor 560 via the transistor 540 and the resistor 554. Accordingly, the transistor 560 is turned on. As a result, the transistor 580 is turned off.

In the present embodiment, the value of the resistor 552 is set such that the power consumption can be reduced to the extent that the transistor 560 can be turned on when the transistor 530 is in the ON state. The value of the resistor 554 is set such that the power consumption can be reduced to the extent that the transistor 560 can be turned on when the transistor 540 is in the ON state.

The capacity of the capacitor 570 is set such that the transistor 560 is turned on before the voltage from the positive terminal 112 is applied to the base of the transistor 580 and the transistor 580 is turned on. The signal generating unit 330 can thereby generate a signal subsequent to the passage of a predetermined amount of time after the determining unit 310 determines whether or not the terminal voltage of the switching element is within the predetermined range.

In contrast, if the terminal voltage of the switching unit 230 is in the range defined by the first value and the second value, the transistor 530 and the transistor 540 remain the OFF state, and the transistor 560 also remains the OFF state. Because of this, the voltage is applied from the positive terminal 112 to the base of the transistor 580 via the resistor 572, so that the transistor 580 is turned on.

The switch 592 and the switch 594 may be manual switches or switching elements such as relays, thyristors, and transistors. A signal 52 indicating that the switching unit 230 will be turned on may be input to the switch 592. A signal 54 indicating that the switching unit 230 will be turned off may be input to the switch 594.

If the switch 592 is turned on, the switching unit 230 can be turned on regardless of whether the transistor 580 is turned on or turned off.

If the switch 594 is turned on, the transistor 580 can be turned off regardless of whether the transistor 560 is turned on or turned off. As a result, the switching unit 230 can be turned off.

Figure 6:
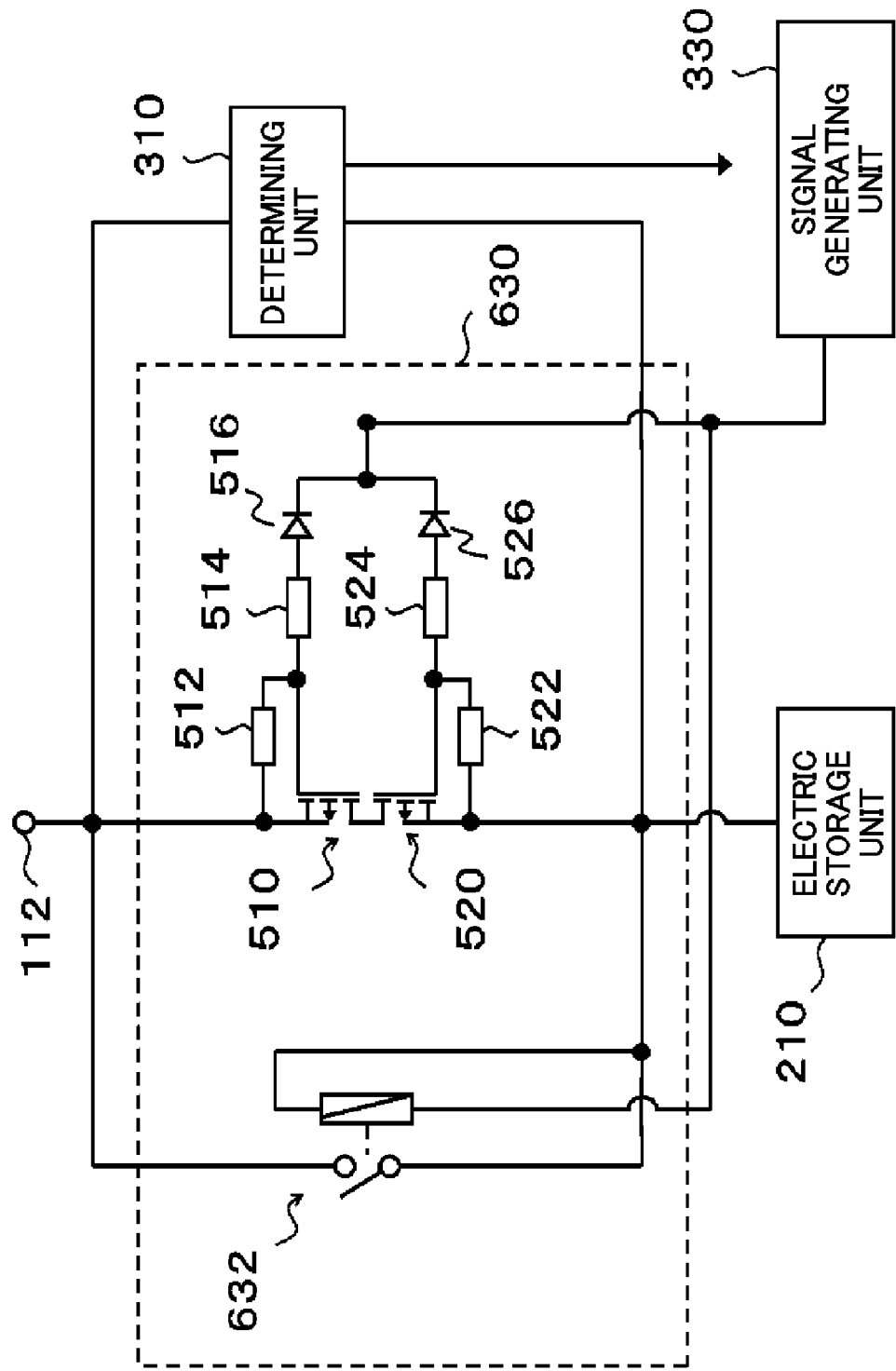
FIG. 6 schematically shows an example of a system configuration of a switching unit 630.

FIG. 6 schematically shows an example of a system configuration of a switching unit 630. The switching unit 630 differs from the switching unit 230 described in association with FIG. 5 in that the switching unit 630 has a relay 632 connected in parallel with the transistor 510 and the transistor 520. The switching unit 630 may have the configuration similar to that of the switching unit 230 in the other respects. In the present embodiment, the transistor 510 and the transistor 520 may be semiconductor transistors. The transistor 510 and the transistor 520 may be field effect transistors (FET).

Although the relay circuit has a superior characteristic that the resistance is small when the circuit is turned on, the relay circuit responds relatively slowly. Because of this, for example, if the load device is a device having pulse current pattern such as a motor, and if the voltage greatly fluctuates in a short period of time, it is difficult for the relay circuit to be turned on upon receiving a signal from the signal generating unit 330. On the other hand, although the semiconductor transistor consumes power more than the relay circuit, the semiconductor transistor is superior in the responsiveness. According to the switching unit 630 of the present embodiment, the transistor 510 or the transistor 520 using the semiconductor transistor, and the relay 632 using the relay circuit are connected in parallel.

Because of this, if the switching unit 230 has received a signal for turning on the switching unit 230 from the signal generating unit 330, first, the transistor 510 or the transistor 520 quickly responds and turns on the switching unit 230. Subsequently, with some delay, the relay 632 is turned on. Then, when the relay 632 is turned on, the relay 632 having a small resistance is connected in parallel with the transistor 510 and the transistor 520. Consequently, the combined resistance becomes small, and then the power loss can be reduced.

Figure 7:
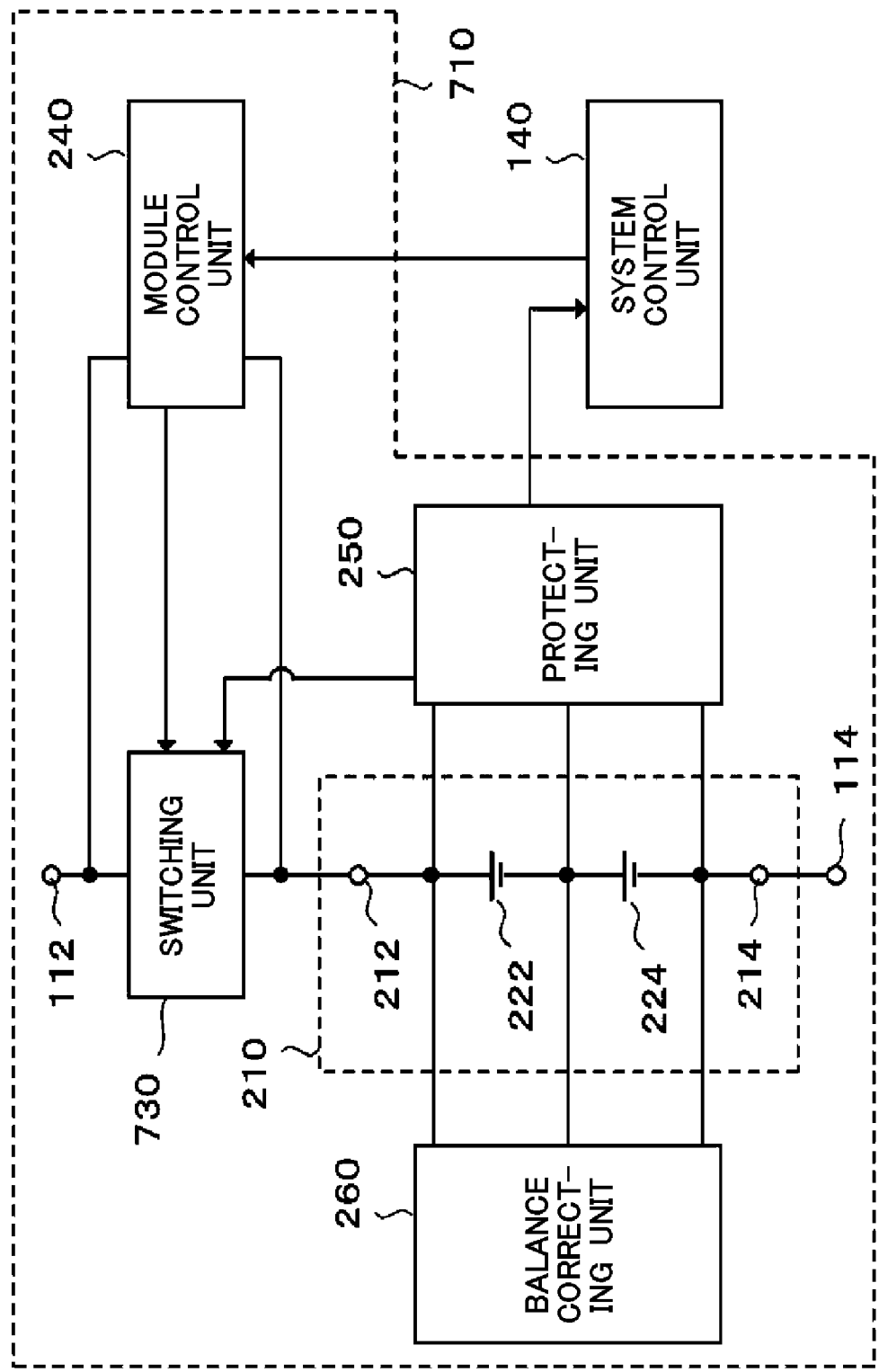
FIG. 7 schematically shows an example of a system configuration of an electric storage module 710.
Figure 8:
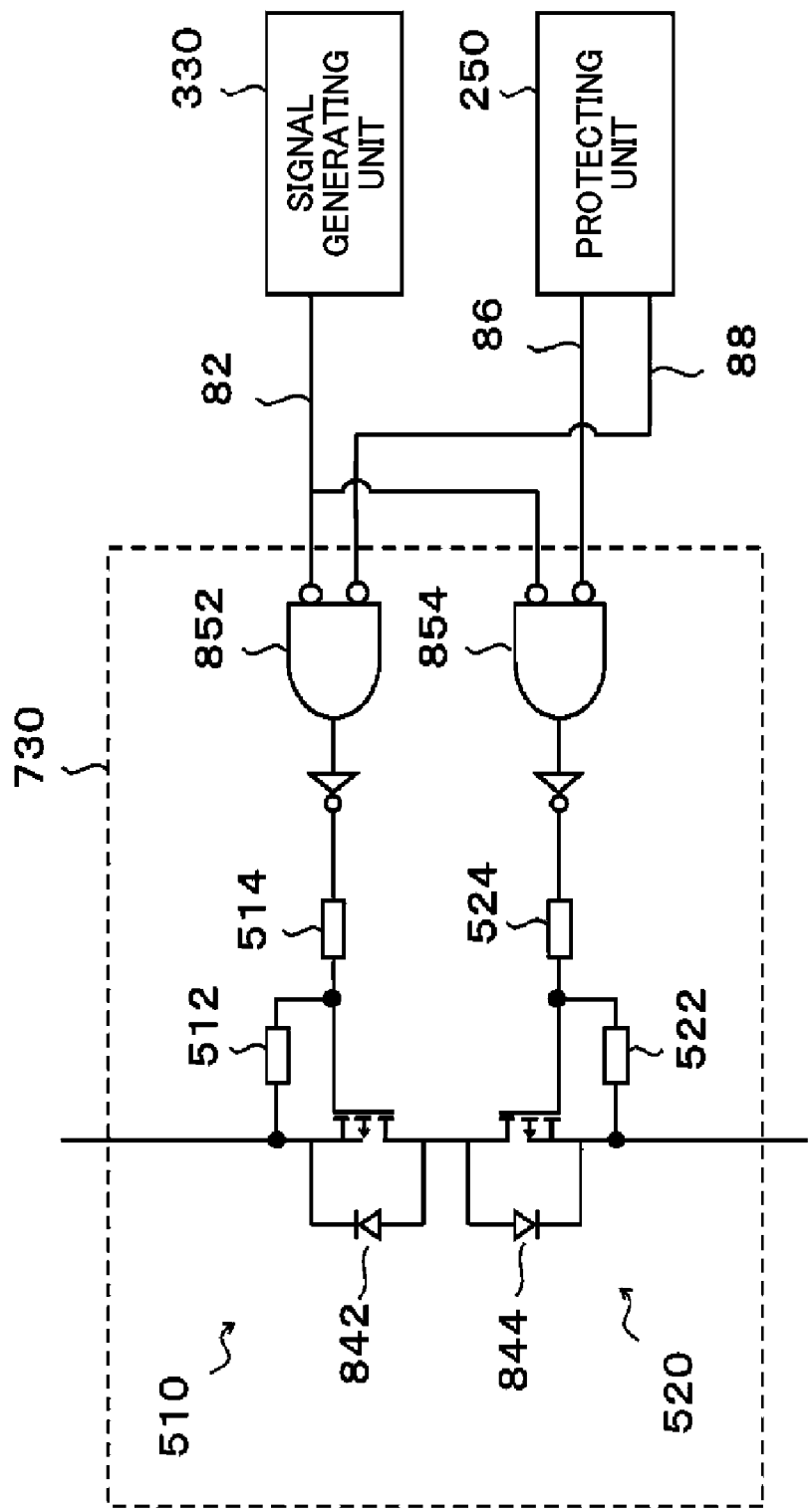
FIG. 8 schematically shows an example of a system configuration of a switching unit 730.

An electric storage module 710 is now explained with reference to FIG. 7 and FIG. 8. FIG. 7 schematically shows an example of a system configuration of the electric storage module 710. FIG. 8 schematically shows an example of a system configuration of a switching unit 730. FIG. 8 shows a parasitic diode 842 of the transistor 510 and a parasitic diode 844 of the transistor 520 in order to facilitate understanding on the operation of the transistor 510 and the transistor 520.

The electric storage module 710 differs from the electric storage module 110 described in association with FIG. 2 in that the electric storage module 710 has the switching unit 730 instead of the switching unit 230 and that a signal from the protecting unit 250 is transmitted to the switching unit 730, not to the module control unit 240. The electric storage module 710 may have the configuration similar to that of the electric storage module 110 in the other respects.

In the present embodiment, the switching unit 730 receives from the module control unit 240 a signal for turning on or turning off the switching unit 730. Also, the switching unit 730 receives from the protecting unit 250 a signal for turning off the switching unit 730.

According to the present embodiment, the transistor 510 is turned on if a signal 82 for turning on the switching element of the switching unit 730 is input to a logic circuit 852 and a signal 88 indicating that the electric storage unit 210 is in the state of overcharge is not input to the logic circuit 852. Also, the transistor 520 is turned on if the signal 82 for turning on the switching element of the switching unit 730 is input to a logic circuit 854 and the signal 86 indicating that the electric storage unit 210 is in the state of over discharge is not input to the logic circuit 854.

Figure 9:
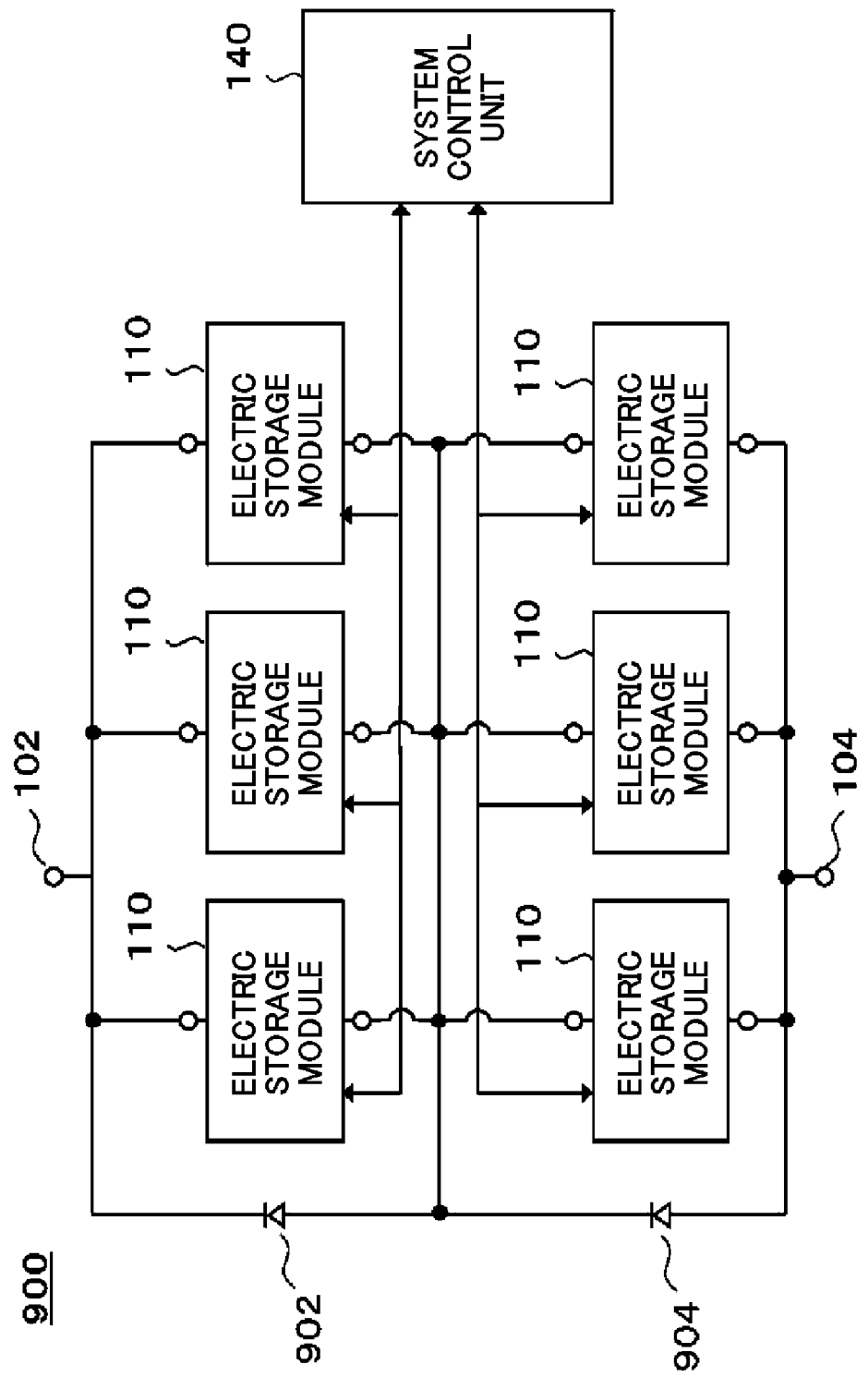
FIG. 9 schematically shows an example of a system configuration of an electric storage system 900.

FIG. 9 schematically shows an example of a system configuration of an electric storage system 900. The electric storage system 900 differs from the electric storage system 100 in that the electric storage system 900 includes a plurality of electric storage modules 110 connected in a matrix. The electric storage system 900 may have the configuration similar to that of the electric storage system 100 in the other respects. In the present embodiment, a first block including three electric storage modules 110 and a diode 902 connected in parallel and a second block including three electric storage modules 110 and a diode 904 connected in parallel are connected in series.

According to the present embodiment, when the electric storage system 900 is discharged, all of the plurality of electric storage modules 110 included in a particular block continue being discharged until they arrive at completely discharged state, and then the discharge from the block stops. According to the present embodiment, even if the discharge from the above described block stops, the diode 902 allows the current to flow. The power supply by the electric storage system 900 can thereby be continued. Because of this, the output voltage decreases stepwise while the electric storage system 900 discharges power.

Similarly, when the electric storage system 900 is charged, the plurality of electric storage modules 110 included in a particular block are sequentially disconnected from the electric storage system 900 upon completion of charging on the first-completed, first-disconnected basis. Then, eventually charging all of the electric storage modules 110 is completed.

According to the present embodiment, the diode 902 and the diode 904 are placed so as to allow the current to flow in a direction (in some cases, referred to as discharge direction) from the connection terminal 104 to the connection terminal 102. Because of this, even if the switching units 230 of all the electric storage modules 110 included in a particular block are turned off, the current can be maintained. On the other hand, once the switching units 230 of all the electric storage modules 110 included in the particular block are turned off, subsequent charging becomes difficult.

According to the present embodiment, if the electric storage system 900 is charged, the system control unit 140 first detects the terminal voltage in each block and checks whether there is a block in which the terminal voltage is 0. Upon finding the block in which the terminal voltage is 0, the system control unit 140 transmits to one of the plurality of electric storage modules 110 included in the block a signal for turning on the switching element of the switching unit 230. The system control unit 140 may transmit a signal for turning on the switching element of the switching unit 230 to the electric storage module 110 that is included in the plurality of electric storage modules 110 in the above described block and has the lowest terminal voltage. Subsequently, the system control unit 140 starts charging the electric storage system 900.

As described above, in the present embodiment, the diode 902 and the diode 904 are placed so as to allow the current to flow in the discharge direction. However, the electric storage system 900 is not limited to the present embodiment. In another embodiment, the diode 902 and the diode 904 may be Zener diodes. Even if charging all of the electric storage modules 110 included in a particular block is completed, and all the electric storage modules 110 included in the block are disconnected from the electric storage system 900, charging another block connected in series with the above described particular block can thereby be continued in the electric storage system 900.

If the electric storage system 900 is discharged in this case, the system control unit 140 may, prior to the start of the discharge, detect the terminal voltage in each group and check whether there is a group in which the terminal voltage is 0. Subsequently, the system control unit 140 may transmit a signal for turning on the switching element of the switching unit 230 to one of the plurality of electric storage modules 110 included in the block in which the terminal voltage is 0.

While the embodiments of the present invention have been described, the technical scope of the invention is not limited to the above described embodiments. It is apparent to persons skilled in the art that various alterations and improvements can be added to the above described embodiments. Also, unless a technical contradiction occurs, the matters described in a particular embodiment can be applied to another embodiment. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE NUMERALS

12: load device; 14: charging device; 52: signal; 54: signal; 82: signal; 86: signal; 88: signal; 100: electric storage system; 102: connection terminal; 104: connection terminal; 106: wire; 110: electric storage module; 112: positive terminal; 114: negative terminal; 120: electric storage module; 122: positive terminal; 124: negative terminal; 140: system control unit; 210: electric storage unit; 212: positive terminal; 214: negative terminal; 222: electric storage cell; 224: electric storage cell; 230: switching unit; 240: module control unit; 250: protecting unit; 260: balance correcting unit; 310: determining unit; 320: receiving unit; 330: signal generating unit; 340: module information acquiring unit; 350: module information storing unit; 360: module information transmitting unit; 410: state managing unit: 420: module selecting unit; 430: signal generating unit; 510: transistor; 512: resistor; 514: resistor; 516: diode; 520: transistor; 522: resistor; 524: resistor; 526: diode; 530: transistor; 532: resistor; 540: transistor; 542: resistor; 552: resistor; 554: resistor; 560: transistor; 570: capacitor; 572: resistor; 580: transistor; 592: switch; 594: switch; 630: switching unit; 632: relay; 710: electric storage module; 730: switching unit; 842: parasitic diode; 844: parasitic diode; 852: logic circuit; 854: logic circuit; 900: electric storage system; 902: diode; 904: diode

What is claimed is:

1. An electric storage module configured to be connected to a wire of a positive side and to a wire of a negative side and to be held in a housing of an electric storage system in a replaceable manner, in parallel with a distinct power supply device, wherein the wire of the positive side and the wire of the negative side are included in the electric storage system, the electric storage module comprising:
    an electric storage unit;
    a first connecting terminal through which the electric storage module is connected to one of the wire of the positive side or the wire of the negative side of the electric storage system;
    a second connecting terminal through which the electric storage module is connected to another of the wire of the positive side or the wire of the negative side of the electric storage system;
    a switch element including a first field effect transistor and a second field effect transistor arranged directly between the first connecting terminal and the electric storage unit; and
    a control unit, wherein
    the control unit is configured to control the switch element such that:
        (i-(a)) the first field effect transistor electrically connects the first connecting terminal and the electric storage unit when the voltage across the terminals of the switch element is higher than a predetermined first value and lower than a predetermined second value that is greater than the first value and is lower than a voltage of the electric storage unit; and
        (i-(b)) the first field effect transistor electrically connects the second connecting terminal and the electric storage unit when the voltage across the terminals of the switch element is higher than the predetermined first value and lower than the predetermined second value and is higher than the voltage of the electric storage unit, and (ii) the first and second field effect transistors electrically disconnects the first connecting terminal and the electric storage unit when the voltage across the terminals of the switch element is lower than the predetermined first value or higher than the predetermined second value, and wherein the control unit is electrically connected (i) to a first node between a first one of the terminals of the switch element and the first connecting terminal, and (ii) to a second node between a second one of the terminals of the switch element and the electric storage unit, a voltage between the first node and the second node is input to the control unit as the voltage across the terminals of the switch element, and the first and second field effect transistors are configured to be in an OFF state, in which the first connecting terminal and the electric storage unit are electrically disconnected, during replacement of the first connecting terminal to the wire of the positive side or the negative side of the electric storage system.

2. The electric storage module according to claim 1, wherein the control unit has:

a determining unit that determines whether the voltage across the terminals of the switch element is within a predetermined range; and a signal generating unit that: (i) generates an ON signal for turning on the switch element when the determining unit has determined that the voltage across the terminals of the switch element is within the predetermined range; or (ii) generates an OFF signal for turning off the switch element when the determining unit has determined that the voltage across the terminals of the switch element is not in the predetermined range.

3. The electric storage module according to claim 2, wherein the control unit has a first signal receiving unit that receives a first signal indicating that a terminal voltage of the electric storage module is lower than a terminal voltage of the distinct power supply device, and the signal generating unit generates the ON signal for turning on the switch element when the first signal receiving unit has received the first signal.

4. The electric storage module according to claim 3, wherein the control unit has a second signal receiving unit that receives a second signal indicating that a terminal voltage of the electric storage module is higher than a terminal voltage of the distinct power supply device, and the signal generating unit generates the ON signal for turning on the switch element when the second signal receiving unit has received the second signal.

5. The electric storage module according to claim 4, wherein the control unit has a third signal receiving unit that receives a third signal indicating that a terminal voltage of the electric storage module is outside the predetermined range, and the signal generating unit generates the OFF signal for turning off the switch element when the third signal receiving unit has received the third signal.

6. The electric storage module according to claim 2, wherein the signal generating unit generates the ON signal and the OFF signal subsequent to passage of a predetermined amount of time after the determining unit determines whether the voltage across the terminals of the switch element is within the predetermined range.

7. The electric storage module according to claim 1, wherein the switch element has a field effect transistor and a relay circuit that are connected in parallel.

8. The electric storage module according to claim 1, wherein the electric storage unit has a plurality of electric storage cells connected in series, and wherein the control unit further comprises a balance correcting unit that equalizes voltage of the plurality of electric storage cells.

9. The electric storage module according to claim 1, wherein the distinct power supply device includes a distinct electric storage module different from the electric storage module.

10. The electric storage module according to claim 9, wherein a deterioration state of the electric storage unit and a deterioration state of an electric storage unit of the distinct electric storage module are different.

11. The electric storage module according to claim 9, wherein a type of the electric storage unit and a type of an electric storage unit of the distinct electric storage module are different.

12. The electric storage module according to claim 1, further comprising:

a battery characteristic acquiring unit that acquires information related to a battery characteristic of the electric storage unit; and an output unit that outputs to an external apparatus of the control unit the information related to the battery characteristic of the electric storage unit and having been acquired by the battery characteristic acquiring unit.

13. An electric storage system in which a plurality of the electric storage modules according to claim 1 are connected in parallel.

14. An electric storage system in which a plurality of the electric storage modules according to claim 1 are connected in a matrix.

15. The electric storage module according to claim 1, wherein:

the first and second field effect transistors are connected in series.

16. An electric storage module configured to be connected to a wire of a positive side and to a wire of a negative side and to be held in a housing of an electric storage system in a replaceable manner, in parallel with a distinct power supply device, wherein the wire of the positive side, the wire of the negative side are included in the electric storage system, the electric storage module comprising:

an electric storage unit;

a first connecting terminal through which a positive side of the electric storage module is connected to the wire of the positive side of the electric storage system;

a field effect transistor arranged directly between the first connecting terminal and a positive side of the electric storage unit;

a second connecting terminal through which a negative side of the electric storage module is connected to the wire of the negative side of the electric storage system;

a switch element including a first field effect transistor and a second field effect transistor arranged directly between the first connecting terminal and the electric storage unit; and a control unit, wherein the control unit is configured to control the switch element, (i-(a)) the first field effect transistor electrically connects the first connecting terminal and the electric storage unit when the voltage across the terminals of the switch element is higher than a predetermined first value and lower than a predetermined second value that is greater than the first value and is lower than a voltage of the electric storage unit; and (i-(b)) the first field effect transistor electrically connects the second connecting terminal and the electric storage unit when the voltage across the terminals of the switch element is higher than the predetermined first value and lower than the predetermined second value and is higher than the voltage of the electric storage unit; and (ii) the first and second field effect transistors electrically disconnect the first connecting terminal from the electric storage unit by outputting a first signal to the switch element to drive the first and second field effect-transistors to be in an OFF state, when the voltage across the terminals of the switch element exceeds a predetermined range of voltage, and while maintaining the first and second field effect transistors in the OFF state when the voltage across the terminals of the switch element exceeds the predetermined range of voltage, generate a signal that shifts the first and second field effect transistors to an ON state when the voltage across the terminals of the switch element decreases to the predetermined range of voltage; and the control unit is electrically connected (i) to a first node between a first one of the terminals of the switch element and the first connecting terminal, and (ii) to a second node between a second one of the terminals of the switch element and the positive side of the electric storage unit, and a voltage between the first node and the second node is input to the control unit as the voltage across the terminals of the switch element.

17. The electric storage module according to claim 16, wherein:

the first and second field effect transistors are connected in series.

\* \* \* \* \*